US012700732B2

(12) United States Patent
Ma et al.

(10) Patent No.: US 12,700,732 B2
(45) Date of Patent: Aug. 4, 2026

(54) DIRECT-DRIVE WIND FARM PARAMETER TUNING METHOD AND SYSTEM CONSIDERING THE INTERACTION BETWEEN GENERATORS

(71) Applicants:NORTH CHINA ELECTRIC POWER UNIVERSITY, Beijing (CN); STATE GRID JIBEI ELECTRIC POWER COMPANY LIMITED, Beijing (CN); Xinjiang Goldwind Science Technology Co., Ltd., Xinjiang (CN); Shenzhen Hopewind Electric Co., Ltd., Guangdong (CN)

(72) Inventors: Jing Ma, Beijing (CN); Honglu Xu, Beijing (CN); Yawen Deng, Beijing (CN); Shuqiang Zhao, Beijing (CN); Yanling Du, Beijing (CN); Jingran Wang, Beijing (CN); Zhiqian Yang, Beijing (CN); Dangsheng Zhou, Beijing (CN)

(73) Assignees: Shanghai University of Electric Power, Shanghai (CN); State Grid Shanghai Municipal Electric Power Company, Shanghai (CN); North China Electric Power University, Beijing (CN); State Nuclear Electric Power Planning Design & Research Institute Co., Ltd, Beijing (CN)

( * ) Notice: Subject to any disclaimer, the term of this patent is extended or adjusted under 35 U.S.C. 154(b) by 513 days.

(21) Appl. No.: 18/124,695

(22) Filed: Mar. 22, 2023

(65) Prior Publication Data

US 2023/0420943 A1    Dec. 28, 2023

(30) Foreign Application Priority Data

Mar. 29, 2022    (CN) .......................... 202210330897.9

(51) Int. Cl.
| | |
|---|---|
| *H02J 3/0014* | (2026.01) |
| *G05B 19/042* | (2006.01) |
| *H02J 103/30* | (2026.01) |

(52) U.S. Cl.
CPC .......... *H02J 3/0014* (2026.01); *G05B 19/042* (2013.01); *G05B 2219/2639* (2013.01); *H02J 2103/30* (2026.01)

(58) Field of Classification Search
CPC ................................. H02J 3/24; G05B 19/042
(Continued)

(56) References Cited

U.S. PATENT DOCUMENTS

| | | | | |
|---|---|---|---|---|
| 9,856,796 B2 * | 1/2018 | Davis, Jr. | ............... | G05B 13/04 |
| 2020/0409323 A1 * | 12/2020 | Spalt | .................. | G05B 13/0265 |
| 2021/0336438 A1 * | 10/2021 | Venkatasubramanian | ................... | |
| | | | | G05B 19/042 |

OTHER PUBLICATIONS

Wang, Yi, et al. "Control of PMSG-based wind turbines for system inertial response and power oscillation damping." IEEE Transactions on Sustainable Energy 6.2 (2015): 565-574. (Year: 2015).*

* cited by examiner

*Primary Examiner* — Mohammad Ali
*Assistant Examiner* — Joshua T Sanders
(74) *Attorney, Agent, or Firm* — Analects Legal LLC

(57) ABSTRACT

A direct-drive wind farm parameter tuning method and system considering the interaction between generators are provided. The method includes: collecting initial oscillation current of each direct-drive wind turbine port in the direct-drive wind farm; according to collected data, taking period of dominant oscillation mode as the iteration period to calculate the overall farm-grid interaction dynamic energy and parameter tuning index of the direct-drive wind farm in current iteration period; obtaining stability level of the direct-drive wind farm based on the overall farm-grid inter- (Continued)

Collect initial oscillation current of each direct-drive wind turbine port in the direct-drive wind farm According to the collected data, take period of dominant oscillation mode as iteration period to calculate overall farm-grid interaction dynamic energy and parameter tuning index of the direct-drive wind farm in the current iteration period Obtaining stability level of the direct-drive wind farm based on the overall farm-grid interaction dynamic energy in the current iteration period; when the system is unstable, optimization model of key control parameters is established with the minimum value of the parameter tuning index in the current iteration period as objective function and range of each key control parameters as constraint condition to achieve the key control parameters tuning of the direct-drive wind farm action dynamic energy in the current iteration period; when the system is unstable, the optimization model of key control parameters is established with the minimum value of the parameter tuning index in the current iteration period as the objective function and the range of each key control parameters as the constraint condition to achieve the key control parameters tuning of the direct-drive wind farm.

10 Claims, 10 Drawing Sheets

(58) Field of Classification Search
USPC ......................................................... 700/287
See application file for complete search history.

Collect initial oscillation current of each direct-drive wind turbine port in the direct-drive wind farm According to the collected data, take period of dominant oscillation mode as iteration period to calculate overall farm-grid interaction dynamic energy and parameter tuning index of the direct-drive wind farm in the current iteration period Obtaining stability level of the direct-drive wind farm based on the overall farm-grid interaction dynamic energy in the current iteration period; when the system is unstable, optimization model of key control parameters is established with the minimum value of the parameter tuning index in the current iteration period as objective function and range of each key control parameters as constraint condition to achieve the key control parameters tuning of the direct-drive wind farm

Fig.1

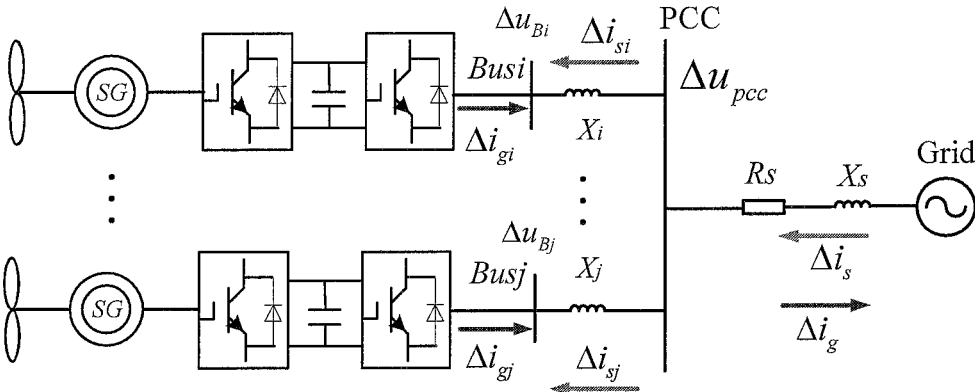

Fig.2

DIRECT-DRIVE WIND FARM PARAMETER TUNING METHOD AND SYSTEM CONSIDERING THE INTERACTION BETWEEN GENERATORS

TECHNICAL FIELD

The present application relates to the field of wind power generation technology and especially to a direct-drive wind farm parameter tuning method and system considering the interaction between generators.

BACKGROUND ART

With the continuous enhancement of power electronics in the power system and the continuous growth of the capacity of direct-drive wind turbine, the weak inertia characteristics of wind turbines lead to the weak anti-interference ability of the power system. Direct-drive wind farm sub/super synchronous oscillation accidents occur more frequently, and the problem of stable and safe operation is facing severe challenges.

At present, there has been a lot of research on sub/super synchronous oscillation of grid connected system of direct-drive wind farm, but the dynamic characteristics and internal mechanism of sub/super synchronous oscillation of grid-connected direct-drive wind farm have not been deeply studied. Therefore, how to quickly and effectively evaluate the overall dynamic stability of the wind farm when the oscillation occurs and provide an accurate theoretical basis for the parameter tuning strategy of the direct-drive wind farm has become an urgent problem to be solved.

However, the existing analysis methods for the sub/super synchronous oscillation of the direct-drive wind farm mainly study the wind farm as a whole, and for the analysis of a single operating state, the stability analysis and parameter tuning of the sub/super synchronous oscillation of the grid-connected direct-drive wind farm considering the interaction between generators have not been studied.

SUMMARY OF THE INVENTION

Given the above analysis, the embodiment of the present application aims to provide a direct-drive wind farm parameter tuning method and system considering the interaction between generators, so as to solve the problems that the interaction between generators is not considered in the existing direct-drive wind farms, the system stability level cannot be effectively evaluated online and parameter configuration is unreasonable.

On the one hand, the present application provides a direct-drive wind farm parameter tuning method considering the interaction between generators, and it comprises the following steps:

Collecting initial oscillation current of each direct-drive wind turbine port in the direct-drive wind farm;

According to the collected data, taking period of dominant oscillation mode as iteration period to calculate overall farm-grid interaction dynamic energy and parameter tuning index of the direct-drive wind farm in the current iteration period;

Obtaining stability level of the direct-drive wind farm based on overall farm-grid interaction dynamic energy in the current iteration period; when the system is unstable, optimization model of key control parameters is established with the minimum value of the parameter tuning index in the current iteration period as objective function and range of each key control parameters as constraint condition to achieve the key control parameters tuning of the direct-drive wind farm.

In addition, based on the collected data, the overall farm-grid interaction dynamic energy and parameter tuning index of the direct-drive wind farm in the current iteration period are calculated by taking the period of the dominant oscillation mode as the iteration period, including:

Taking the collected data as initial iteration period data, generator-grid interaction dynamic energy, inter-generator coupling interaction dynamic energy and inter-generator induction interaction dynamic energy of each PMSG in each iteration period are calculated, where the period of dominant oscillation mode is the iteration period;

Based on the generator-grid interaction dynamic energy, the inter-generator coupling interaction dynamic energy and the inter-generator induction interaction dynamic energy of each PMSG in each iteration period, obtaining the overall farm-grid interaction dynamic energy of the direct-drive wind farm in the current iteration period;

Based on the generator-grid interaction dynamic energy, the inter-generator coupling interaction dynamic energy of each PMSG in each iteration period, obtaining the parameter tuning index of the direct-drive wind farm in the current iteration period.

Moreover, the key control parameters comprise: current loop proportional gain, phase-locked loop proportional gain, grid-connected line inductance, active current reference value, and the key control parameter optimization model is expressed as:

$$
\begin{cases}
\min_{\alpha} S_n = \eta_F(\alpha) \\
\text{s.t. } P(K) = 0 \\
K_{P\_min}^j \leq K_P^j \leq K_{P\_max}^j \\
K_{P\theta\_min}^j \leq K_{P\theta}^j \leq K_{P\theta\_max}^j \\
L_{xj\_min} \leq L_{xy} \leq L_{xj\_max} \\
i_{gdj\_min}^* \leq i_{gdj}^* \leq i_{gdj\_max}^* \\
\alpha = \left[ K_P^j, K_{P\theta}^j, L_{xj}, i_{gdj}^* \right]
\end{cases}
$$

Where $S_n$ is the objective function of the current iteration period, $\eta_F$ is the parameter tuning index of the current iteration period, $P(K)=0$ means that the power flow meets the static security and stability conditions;

$$K_{P\_min}^j \text{ and } K_{P\_max}^j$$

are the lower and upper limit of the current loop proportional gain $$K_P^j$$

of the jth PMSG respectively;

$$K_{P\theta\_min}^j \text{ and } K_{P\theta\_max}^j$$

are the lower and upper limit of the PLL proportion gain $$K_{P\theta}^j$$

of the jth PMSG respectively; $L_{xj\_min}$ and $L_{xj\_max}$ are the lower and upper limit of the integration distance of the jth PMSG respectively;

$$i_{gdj\_min}^* \text{ and } i_{gdj\_max}^*$$

are the lower and upper limit of the reference value of active current of the jth PMSG respectively; $\alpha$ is set of decision variables.

Then, the parameter tuning index of the direct-drive wind farm in the current iteration period is expressed as:

$$\eta_F = \Delta W_{Fs}^n + \Delta W_{Fcp}^n$$

Where $$\Delta W_{Fs}^n$$

is the overall generator-grid interaction dynamic energy of the direct-drive wind farm after n iteration periods, $$\Delta W_{Fcp}^n$$

is the overall inter-generator coupling interaction dynamic energy of the direct-drive wind farm after n iteration periods, and n is the number of iteration periods from the initial iteration period to the current iteration period;

The overall farm-grid interaction dynamic energy of the direct-drive wind farm in the current iteration period $$\Delta W_F^n$$

is expressed as:

$$\Delta W_F^n = \Delta W_{Fs}^n + \Delta W_{Fcp}^n + \Delta W_{Fin}^n$$

Where $$\Delta W_{Fin}^n$$

is the overall inter-generator induction interaction dynamic energy of the direct-drive wind farm after n iteration periods.

The stability level of the direct-drive wind farm is obtained based on the overall farm-grid interaction dynamic energy $$\Delta W_F^n$$

of the current iteration period, including:

Another object of the present application is achieved through the following technical solutions:

When $$\Delta W_F^n < 0,$$

the direct-drive wind farm has a positive damping effect on oscillation, and the system is in a stable state. The smaller the value, the higher the stability level;

When $$\Delta W_F^n = 0,$$

the direct-drive wind farm has no damping effect on the oscillation, and the system is in a critical stable state;

When $$\Delta W_F^n > 0,$$

the direct-drive wind farm has a negative damping effect on the oscillation, and the system oscillation divergence will be completely unstable.

The overall generator-grid interaction dynamic energy of the direct-drive wind farm after n iteration periods $$\Delta W_{Fs}^n$$

is expressed as:

$$\Delta W_{Fs}^n = \sum_{k=1}^n \sum_{j=1}^m \sum_{\substack{i=1, \\ i \neq j}}^m \Delta W_{js}^{(k)}$$

Where $$\Delta W_{js}^{(k)}$$

represents the generator-grid interaction dynamic energy of the jth PMSG in the kth iteration period, and m represents total number of PMSGs;

The overall inter-generator coupling interaction dynamic energy of the direct-drive wind farm after n iteration periods $$\Delta W_{Fcp}^n$$

is expressed as:

$$\Delta W_{Fcp}^n = \sum_{k=1}^n \sum_{j=1}^m \sum_{\substack{i=1, \\ i \neq j}}^m \Delta W_{ij\_cp}^{(k)}$$

Where $$\Delta W_{ij\_cp}^{(k)}$$

(5)

represents the inter-generator coupling interaction dynamic energy between the jth PMSG and the ith PMSG in the kth iteration period;

The overall inter-generator induction interaction dynamic energy of the direct-drive wind farm after n iteration periods $$\Delta W_{Fin}^{n}$$

(15)

is expressed as:

$$\Delta W_{Fm}^{n} = \sum_{k=1}^{n} \sum_{j=1}^{m} \sum_{\substack{i=1, \\ i \neq j}}^{m} \Delta W_{ij\_m}^{(k)}$$

Where $$\Delta W_{ij\_in}^{(k)}$$

(30)

represents the inter-generator induction interaction dynamic energy between the jth PMSG and the ith PMSG in the kth iteration period;

The generator-grid interaction dynamic energy of the jth PMSG in the kth iteration period $$\Delta W_{js}^{(k)}$$

is expressed as:

$$\Delta W_{js}^{(k)} = 0.5\omega\sqrt{(U_{Bd0j} + I_{gd0j}R_s)^2 + [\omega I_{gd0j}(L_s + L_{sj})]^2}$$

$$\sum_{r=1}^{4} \sum_{t=1}^{4} (-1)^r C_{rt} |G_{dr}^{jK}| \left[ \begin{array}{l} |M_{jd}^{j}||G_{dt}^{jK}|os(\varphi_{gdr}^{jk} - \varphi_{gdt}^{jk} - \varphi_{d1t}^{j}) + \\ |M_{jq}^{j}||G_{qt}^{jK}|\cos(\varphi_{gdr}^{jk} - \varphi_{gqt}^{j} - \varphi_{q1t}^{j}) \end{array} \right] \Delta t - 0.5\omega\omega_0$$

(50)

$$I_{gd0j}(L_s + L_{xj})\left\{ \begin{array}{l} \sum_{r=1,3}^{4} \sum_{t=1}^{4} C_{rt}|G_{qr}^{jK}| \left[ \begin{array}{l} -|M_{jd}^{j}||G_{dt}^{jK}|\cos(\varphi_{gqr}^{jk} - \varphi_{gdt}^{jk} - \varphi_{d2t}^{j}) - \\ |M_{jq}^{j}||G_{qt}^{jK}|\cos(\varphi_{gqr}^{jk} - \varphi_{gqt}^{jk} - \varphi_{q2t}^{j}) \end{array} \right] + \\ \sum_{r=2,4}^{4} \sum_{t=1}^{4} C_{rt}|G_{qr}^{jK}| \left[ \begin{array}{l} |M_{jd}^{j}||G_{dt}^{jK}|\sin(\varphi_{gqr}^{jk} - \varphi_{gdt}^{jk} - \varphi_{g2t}^{j}) + \\ |M_{jq}^{j}||G_{qt}^{jK}|\sin(\varphi_{gqr}^{jk} - \varphi_{gqt}^{jk} - \varphi_{q2t}^{j}) \end{array} \right] \end{array} \right\}$$

(55)

$$\Delta t + 0.5\omega\sqrt{R_s^2 + \omega^2(L_s + L_{sj})^2}$$

$$\left\{ \begin{array}{l} \sum_{r=1,3}^{4} \sum_{t=1}^{4} (-1)^{t+1} C_{rt} \left[ \begin{array}{l} |G_{dr}^{jK}||G_{qt}^{jK}|\cos(\varphi_{gdr}^{jk} - \varphi_{gqt}^{jk} - \varphi_{1t}^{j}) - \\ |G_{qr}^{jK}||G_{dt}^{jK}|\cos(\varphi_{gqr}^{jk} - \varphi_{gdt}^{jk} - \varphi_{1t}^{j}) \end{array} \right] + \\ \sum_{r=2,4}^{4} \sum_{t=1}^{4} (-1)^{t} C_{rt} \left[ \begin{array}{l} |G_{dr}^{jK}||G_{qt}^{jK}|\sin(\varphi_{gdr}^{jk} - \varphi_{gqt}^{jk} - \varphi_{1t}^{j}) - \\ |G_{qr}^{jK}||G_{dt}^{jK}|\sin(\varphi_{gqr}^{jk} - \varphi_{gdt}^{jk} - \varphi_{1t}^{j}) \end{array} \right] \end{array} \right\}\Delta t$$

(60)
(65)

-continued where $$\varphi_{d1t}^{j} = \begin{cases} \sigma_r - \sigma_t + \varphi_c^{j} + \varphi_{mdj}^{j} & t = 1, 3 \\ \sigma_r - \sigma_t + \varphi_c^{j} + \varphi_{mdj}^{j} + 90° & t = 2, 4 \end{cases}$$

$$\varphi_{q1t}^{j} = \begin{cases} \sigma_r - \sigma_t + \varphi_c^{j} + \varphi_{mqj}^{j} & t = 1, 3 \\ \sigma_r - \sigma_t + \varphi_c^{j} + \varphi_{mqj}^{j} + 90° & t = 2, 4 \end{cases};$$

$$\varphi_{d2t}^{j} = \begin{cases} \sigma_r - \sigma_t + \varphi_{mdj} + 90° & t = 1, 3 \\ \sigma_r - \sigma_t + \varphi_{mdj}^{j} & t = 2, 4 \end{cases}$$

$$\varphi_{q2t}^{j} = \begin{cases} \sigma_r - \sigma_t + \varphi_{mqj}^{j} + 90° & t = 1, 3 \\ \sigma_r - \sigma_t + \varphi_{mqj}^{j} & t = 2, 4 \end{cases};$$

$$\varphi_{1t}^{j} = \begin{cases} \sigma_r - \sigma_t - \arctan[R_s/(\omega L_s + \omega L_{xj})] & t = 1, 3 \\ \sigma_r - \sigma_t + \arctan[(\omega L_s + \omega L_{xj})/R_s] & t = 2, 4 \end{cases}$$

$$\varphi_c^{j} = \begin{cases} \arctan[(U_{Bd0j} + I_{gd0j}R_s)/\omega I_{gd0j}(L_s + L_{xj})] & r = 1, 3 \\ -\arctan[\omega I_{gd0j}(L_s + L_{xj})/(U_{Bd0j} + I_{gd0j}R_s)] & r = 2, 4 \end{cases};$$

$$\sigma_r = \begin{cases} \varphi_{sj} & r = 1, 2 \\ \varphi_{si} & r = 3, 4 \end{cases}$$

$$\sigma_t = \begin{cases} \varphi_{sj} & t = 1, 2 \\ \varphi_{si} & t = 3, 4 \end{cases};$$

$$C_{rt} = \begin{cases} I_{sj}I_{sj} & r, t \in [1, 2] \\ I_{si}I_{si} & r, t \in [3, 4] \\ I_{sj}I_{si} & \text{others} \end{cases};$$

$$\begin{cases} M_{jd}^{j} = M_{pllj}(\omega_0 L_s + \omega_0 L_{xj}) \\ M_{jq}^{j} = M_{pllj}(R_s + sL_s + sL_{xj}) \\ M_{pllj} = \dfrac{sK_{P\theta}^{j} + K_{I\theta}^{j}}{s^2} \end{cases};$$

$$\begin{pmatrix} G_{d1}^{jK} & G_{d2}^{jK} & G_{d3}^{jK} & G_{d4}^{jK} \\ G_{q1}^{jK} & G_{q2}^{jK} & G_{q3}^{jK} & G_{q4}^{jK} \\ G_{d1}^{iK} & G_{d2}^{iK} & G_{d3}^{iK} & G_{d4}^{iK} \\ G_{q1}^{iK} & G_{q2}^{iK} & G_{q3}^{iK} & G_{q4}^{iK} \end{pmatrix} = \begin{pmatrix} G_{d1}^{j} & G_{d2}^{j} & G_{d3}^{j} & G_{d4}^{j} \\ G_{q1}^{j} & G_{q2}^{j} & G_{q3}^{j} & G_{q4}^{j} \\ G_{d1}^{i} & G_{d2}^{i} & G_{d3}^{i} & G_{d4}^{i} \\ G_{q1}^{i} & G_{q2}^{i} & G_{q3}^{i} & G_{q4}^{i} \end{pmatrix}^{k};$$

$$\begin{cases} G_{d1}^{j} = F_d^{j}[U_{Bd0j} + I_{gd0j}(R_s + sL_s + sL_{xj})] \\ G_{d2}^{j} = F_d^{j}I_{gd0j}\omega_0(-L_s - L_{xj}) \\ G_{d3}^{j} = F_d^{j}I_{gd0j}(R_s + sL_s) \\ G_{d4}^{j} = F_d^{j}(-I_{gd0j}\omega_0 L_s) \end{cases};$$

$$\begin{cases} G_{q1}^{j} = F_q^{j}(R_s + sL_s + sL_{xj}) \\ G_{q2}^{j} = F_q^{j}\omega_0(-L_s - L_{xj}) \\ G_{q3}^{j} = F_q^{j}(R_s + sL_s) \\ G_{q4}^{j} = F_q^{j}(-\omega_0 L_s) \end{cases};$$

$$F_d^{j} = \frac{\left(K_P^{j} + \dfrac{K_I^{j}}{s}\right)\left(K_{Pu}^{j} + \dfrac{K_{Iu}^{j}}{s}\right)}{K_P^{j} + \dfrac{K_I^{j}}{s} + R_{1j} + sL_{1j}} \frac{1}{sC_{dc}U_{dc0}};$$

$$F_q^{j} = -\frac{\left(K_P^{j} + \dfrac{K_I^{j}}{S}\right)\omega_0 C_f}{K_P^{j} + \dfrac{K_I^{j}}{s} + R_{1j} + sL_{1j}};$$

Where ω is sub/super synchronous oscillation frequency in dq axis, $\omega_0$ is angular frequency of grid, $U_{Bd0j}$ and $I_{gd0j}$ are steady-state values of d-axis voltage and current at port of the jth PMSG respectively, $R_s$ and $L_s$ are resistance and inductance of AC line, $L_{xj}$ is inductance of grid-connecting line, $$\varphi_{gdr}^{jk}, \varphi_{gdt}^{jk}, \varphi_{gqr}^{jk} \text{ and } \varphi_{gqt}^{jk}$$

are phases of $$G_{dr}^{jK}, G_{dt}^{jK}, G_{qr}^{jK} \text{ and } G_{qt}^{jK}$$

respectively, $\varphi_{sj}$ and $\varphi_{si}$ are initial phase of initial sub/super synchronous current of the jth and ith PMSG respectively, $I_{sj}$ and $I_{si}$ are amplitudes of the initial sub/super synchronous current of the jth and ith PMSG respectively, s is Laplace operator, $$\varphi_{mdj}^{j} \text{ and } \varphi_{mqj}^{j}$$

are phases of $$M_{jd}^{j} \text{ and } M_{jq}^{j}$$

respectively, $$K_P^{j} \text{ and } K_I^{j}$$

are current loop proportion and integral gains of the jth PMSG respectively, $$K_{P\theta}^{j} \text{ and } K_{I\theta}^{j}$$

are proportional and integral gains of phase-locked loop of the jth PMSG respectively, $$K_{Pu}^{j} \text{ and } K_{Iu}^{j}$$

are proportional and integral gains of the voltage outer loop of the jth PMSG respectively, $R_{1j}$ and $L_{1j}$ are equivalent resistance and inductance of filter respectively, $C_{dc}$ is DC capacitance, $U_{dc0}$ is steady-state value of DC bus voltage, $C_f$ is filter capacitor.

The inter-generator coupling interaction dynamic energy between the jth PMSG and the ith PMSG in the kth iteration period $$\Delta W_{ij\_cp}^{(k)}$$

is expressed as:

$$\Delta W_{ij\_cp}^{(k)} = 0.5\omega\sqrt{(U_{Bd0j} + I_{gd0j}R_s)^2 + (\omega I_{gd0j}(L_s + L_{xj}))^2}$$

$$\sum_{r=1}^{4}\sum_{t=1}^{4}(-1)^r C_{rt}|G_{dr}^{jK}|\left[\begin{array}{l}|M_{id}^{j}||G_{dt}^{iK}|\cos(\varphi_{gdr}^{jk} - \varphi_{gdt}^{jk} - \varphi_{d3t}^{j}) + \\ |M_{iq}^{j}||G_{qt}^{iK}|\cos(\varphi_{gdr}^{jk} - \varphi_{gqt}^{jk} - \varphi_{q3t}^{j})\end{array}\right]\Delta t - 0.5\omega\omega_0$$

$$I_{gd0j}(L_s + L_{xj})\left\{\begin{array}{l}\sum_{r=1,3}\sum_{t=1}^{4}C_{rt}|G_{qr}^{jK}|\left[\begin{array}{l}-|M_{id}^{j}||G_{dt}^{iK}|\cos(\varphi_{gqr}^{jk} - \varphi_{gdt}^{jk} - \varphi_{d4t}^{j}) - \\ |M_{iq}^{j}||G_{qt}^{iK}|\cos(\varphi_{gqr}^{jk} - \varphi_{gqt}^{jk} - \varphi_{q4t}^{j})\end{array}\right] + \\ \sum_{r=2,4}\sum_{t=1}^{4}C_{rt}|G_{qr}^{jK}|\left[\begin{array}{l}|M_{id}^{j}||G_{dt}^{iK}|\sin(\varphi_{gqr}^{jk} - \varphi_{gdt}^{jk} - \varphi_{d4t}^{j}) + \\ |M_{iq}^{j}||G_{qt}^{iK}|\sin(\varphi_{gqr}^{jk} - \varphi_{gqt}^{jk} - \varphi_{q4t}^{j})\end{array}\right]\end{array}\right\}$$

$$\Delta t + 0.5\omega\sqrt{(I_{gd0j}R_s)^2 + (\omega I_{gd0j}L_s)^2}$$

$$\sum_{r=1}^{4}\sum_{t=1}^{4}(-1)^r C_{rt}|G_{dr}^{iK}|\left[\begin{array}{l}|M_{id}^{j}||G_{dt}^{jK}|\cos(\varphi_{gdr}^{ik} - \varphi_{gdt}^{jk} - \varphi_{d5t}^{j}) + \\ |M_{iq}^{j}||G_{qt}^{jK}|\cos(\varphi_{gdr}^{ik} - \varphi_{gqt}^{jk} - \varphi_{q5t}^{j})\end{array}\right]\Delta t -$$

$$0.5\omega\omega_0 I_{gd0j}L_s\left\{\begin{array}{l}\sum_{r=1,3}\sum_{t=1}^{4}C_{rt}|G_{qr}^{iK}|\left[\begin{array}{l}-|M_{jd}^{j}||G_{dt}^{jK}|\cos(\varphi_{gqr}^{ik} - \varphi_{gdt}^{jk} - \varphi_{d2t}^{j}) - \\ |M_{jq}^{j}||G_{qt}^{jK}|\cos(\varphi_{gqr}^{ik} - \varphi_{gqt}^{jk} - \varphi_{q2t}^{j})\end{array}\right] + \\ \sum_{r=2,4}\sum_{t=1}^{4}C_{rt}|G_{qr}^{iK}|\left[\begin{array}{l}|M_{jk}^{j}||G_{dt}^{jK}|\sin(\varphi_{gqr}^{ik} - \varphi_{gdt}^{jk} - \varphi_{d2t}^{j}) + \\ |M_{jq}^{j}||G_{qt}^{jK}|\sin(\varphi_{gqr}^{ik} - \varphi_{gqt}^{jk} - \varphi_{q2t}^{j})\end{array}\right]\end{array}\right\}$$

$$\Delta t + 0.5\omega\sqrt{R_s^2 + (\omega L_s)^2}$$

$$\left\{\begin{array}{l}\sum_{r=1,3}\sum_{t=1}^{4}(-1)^{t+1}C_{rt}\left[\begin{array}{l}|G_{dr}^{jK}||G_{qt}^{iK}|\cos(\varphi_{gdr}^{jk} - \varphi_{gqt}^{ik} - \varphi_{2t}^{j}) - \\ |G_{qr}^{jK}||G_{dt}^{iK}|\cos(\varphi_{gqr}^{jk} - \varphi_{gdt}^{ik} - \varphi_{2t}^{j})\end{array}\right] + \\ \sum_{r=2,4}\sum_{t=1}^{4}(-1)^t C_{rt}\left[\begin{array}{l}|G_{dr}^{jK}||G_{qt}^{iK}|\sin(\varphi_{gdr}^{jk} - \varphi_{gqt}^{ik} - \varphi_{2t}^{j}) - \\ |G_{qr}^{jK}||G_{dt}^{iK}|\sin(\varphi_{gqr}^{jk} - \varphi_{gdt}^{ik} - \varphi_{2t}^{j})\end{array}\right]\end{array}\right\}\Delta t +$$

$$0.5\omega\omega_0 L_s\left\{\begin{array}{l}\sum_{r=1,3}\sum_{t=1}^{4}C_{rt}\left[\begin{array}{l}|G_{dr}^{jK}||G_{dt}^{iK}|\sin(\varphi_{gdr}^{jk} - \varphi_{gdt}^{ik} - \varphi_{d6t}^{j}) - \\ |G_{qr}^{jK}||G_{qt}^{iK}|\sin(\varphi_{gqr}^{jk} - \varphi_{gqt}^{ik} - \varphi_{g6t}^{j})\end{array}\right] + \\ \sum_{r=2,4}\sum_{t=1}^{4}C_{rt}\left[\begin{array}{l}|G_{dr}^{jK}||G_{dt}^{iK}|\cos(\varphi_{gdr}^{jk} - \varphi_{gdt}^{ik} - \varphi_{d6t}^{j}) - \\ |G_{qr}^{jK}||G_{qt}^{iK}|\cos(\varphi_{gqr}^{jk} - \varphi_{gqt}^{ik} - \varphi_{d6t}^{j})\end{array}\right]\end{array}\right\}\Delta t$$

where $$\varphi_{d3t}^{j} = \begin{cases}\sigma_r - \sigma_t + \varphi_c^{j} + \varphi_{mdi}^{j} & t = 1, 3 \\ \sigma_r - \sigma_t + \varphi_c^{j} + \varphi_{mdi}^{j} + 90° & t = 2, 4\end{cases};$$

$$\varphi_{q3t}^{j} = \begin{cases}\sigma_r - \sigma_t + \varphi_c^{j} + \varphi_{mqi}^{j} & t = 1, 3 \\ \sigma_r - \sigma_t + \varphi_c^{j} + \varphi_{mqi}^{j} + 90° & t = 2, 4\end{cases}$$

$$\varphi_{d4t}^{j} = \begin{cases}\sigma_r - \sigma_t + \varphi_{mdi}^{j} + 90° & t = 1, 3 \\ \sigma_r - \sigma_t + \varphi_{mdi}^{j} & t = 2, 4\end{cases};$$

$$\varphi_{q4t}^{j} = \begin{cases}\sigma_r - \sigma_t + \varphi_{mqi}^{j} + 90° & t = 1, 3 \\ \sigma_r - \sigma_t + \varphi_{mqi}^{j} & t = 2, 4\end{cases}$$

$$\varphi_{d5t}^{j} = \begin{cases}\sigma_r - \sigma_t + \varphi_p^{j} + \varphi_{mdj}^{j} & t = 1, 3 \\ \sigma_r - \sigma_t + \varphi_p^{j} + \varphi_{mdj}^{j} + 90° & t = 2, 4\end{cases};$$

$$\varphi_{d5t}^{j} = \begin{cases}\sigma_r - \sigma_t + \varphi_p^{j} + \varphi_{mqj}^{j} & t = 1, 3 \\ \sigma_r - \sigma_t + \varphi_p^{j} + \varphi_{mqj}^{j} + 90° & t = 2, 4\end{cases}$$

$$\varphi_{q6t}^{j} = \begin{cases}\sigma_r - \sigma_t & t = 1, 3 \\ \sigma_r - \sigma_t + 90° & t = 2, 4\end{cases}$$

$$\varphi_{2t}^{j} = \begin{cases}\sigma_r - \sigma_t - \arctan[R_s/(\omega L_s)] & t = 1, 3 \\ \sigma_r - \sigma_t + \arctan[(\omega L_s)/R_s] & t = 2, 4\end{cases};$$

$$\varphi_p^{j} = \begin{cases}\arctan[R_s/(\omega L_s)] & r = 1, 3 \\ -\arctan[(\omega L_s)/R_s] & r = 2, 4\end{cases}; \begin{cases}M_{id}^{j} = M_{plij}\omega_0 L_s \\ M_{iq}^{j} = M_{plij}(R_s + sL_s)\end{cases}.$$

The inter-generator induction interaction dynamic energy between the jth PMSG and the ith PMSG in the kth iteration period $$\Delta W_{ij\_in}^{(k)}$$

is expressed as:

$$\Delta W_{ij\_in}^{(k)} = 0.5\omega I_{gd0j}\sqrt{R_s^2 + (\omega L_s)^2}$$

$$\sum_{r=1}^{4}\sum_{t=1}^{4}(-1)^r C_{rt}|G_{dr}^{iK}|\left[\begin{array}{c}|M_{id}^j||G_{dt}^{iK}|\cos(\varphi_{gdr}^{ik} - \varphi_{gdt}^{ik} - \varphi_{d7t}^j) + \\ |M_{iq}^j||G_{qt}^{iK}|\cos(\varphi_{gdr}^{ik} - \varphi_{gqt}^{ik} - \varphi_{q7t}^j)\end{array}\right]\Delta t - 0.5\omega\omega_0$$

$$I_{gd0j}L_s\left\{\begin{array}{c}\sum_{r=1,3}\sum_{t=1}^{4}C_{rt}|G_{qr}^{iK}|\left[\begin{array}{c}-|M_{id}^j||G_{dt}^{iK}|\cos(\varphi_{gqr}^{ik} - \varphi_{gdt}^{ik} - \varphi_{d2t}^j) - \\ |M_{iq}^j||G_{qt}^{iK}|\cos(\varphi_{gqr}^{ik} - \varphi_{gqt}^{ik} - \varphi_{q2t}^j)\end{array}\right] + \\ \sum_{r=2,4}\sum_{t=1}^{4}C_{rt}|G_{qr}^{iK}|\left[\begin{array}{c}|M_{id}^j||G_{dt}^{iK}|\sin(\varphi_{gqr}^{ik} - \varphi_{gdt}^{ik} - \varphi_{d2t}^j) + \\ |M_{iq}^j||G_{qt}^{iK}|\sin(\varphi_{gqr}^{ik} - \varphi_{gqt}^{ik} - \varphi_{q2t}^j)\end{array}\right]\end{array}\right\}\Delta t$$

where $$\varphi_{d7t}^j = \begin{cases}\sigma_r - \sigma_t + \varphi_p^j + \varphi_{mdi}^j & t = 1, 3 \\ \sigma_r - \sigma_t + \varphi_p^j + \varphi_{mdi}^j + 90° & t = 2, 4\end{cases}$$

$$\varphi_{q7t}^j = \begin{cases}\sigma_r - \sigma_t + \varphi_p^j + \varphi_{mqi}^j & t = 1, 3 \\ \sigma_r - \sigma_t + \varphi_p^j + \varphi_{mqi}^j + 90° & t = 2, 4\end{cases}$$

On the other hand, the present application provides a direct-drive wind farm parameter tuning system considering the interaction between generators, including data acquisition module, system stability evaluation module and parameter optimization module.

The data acquisition module is used to collect the initial oscillation current of each PMSG port in the direct-driven wind farm.

The system stability evaluation module is used to, according to the collected data, take the period of the dominant oscillation mode as the iteration period to calculate the overall farm-grid interaction dynamic energy, and parameter tuning index of the direct-drive wind farm in the current iteration period; obtaining the stability level of the direct-drive wind farm based on the overall farm-grid interaction dynamic energy in the current iteration period.

The parameter optimization module is used to, according to the result of system stability assessment, when the system is unstable, the optimization model of key control parameters is established with the minimum value of the parameter tuning index in the current iteration period as the objective function and the range of each key control parameters as the constraint condition to achieve the key control parameters tuning of the direct-drive wind farm.

Compared with the prior art, the present application has the following advantages:

1. The calculation amount is reduced, the calculation accuracy is improved and the reliable operation of the system is ensured by constructing the overall farm-grid interaction dynamic energy and the system parameter tuning index.

2. The system stability analysis result is obtained through the overall farm-grid interaction dynamic energy of the direct-drive wind farm, which can quickly and effectively evaluate the stability level of the grid-connected direct-drive wind farm, realize the early warning of oscillation risk, and ensure the stable and safe operation of the power system.

3. By establishing the optimization model of key control parameters, the system parameters are optimized and tuned, which significantly improves the ability of direct-drive wind farm to suppress oscillation.

In the present application, the above technical schemes can also be combined with each other to realize more preferred combination schemes. Other features and advantages of the present application will be described in the following instructions, and some advantages may become apparent from the instructions or be understood by implementing the present application. The object and other advantages of the present application can be realized and obtained through the contents specially pointed out in the instructions and the accompanying drawings.

BRIEF DESCRIPTION OF DRAWINGS

The drawings are only to show specific embodiments and are not considered as a limitation of the present application. In the whole drawings, the same reference symbols represent the same components.

FIG. 1 is flowchart of the direct-drive wind farm parameter tuning method considering the interaction between generators in Embodiment 1 of the present application.

FIG. 2 is structure diagram of direct-drive wind farm grid-connected system provided in Embodiment 3 of the present application.

DETAILED DESCRIPTION OF THE INVENTION

The preferred embodiments of the present application are described in detail below in combination with the accompanying drawings. The accompanying drawings form part of the application and, together with the embodiments of the present application, are used to explain the principle of the present application, not to limit the scope of the present application.

The simplified model diagram of the direct-drive wind farm is shown in FIG. 2, including several wind turbines.

Figure 3:
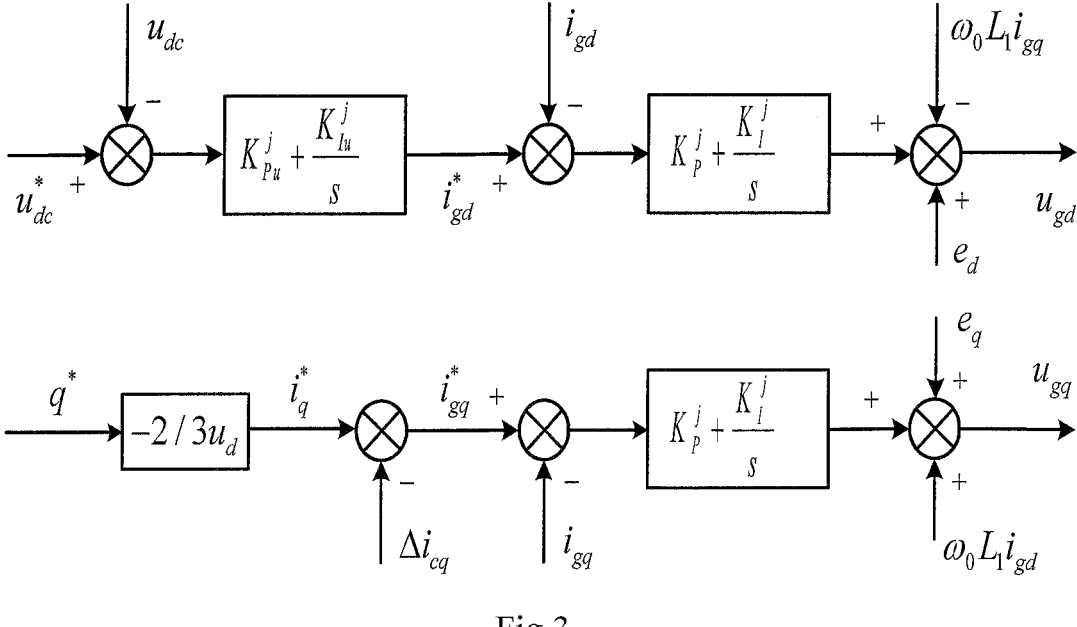
FIG. 3 is control block diagram of direct-drive wind turbine grid-side converter provided in Embodiment 3 of the present application.

After passing through the rotor side converter and the grid side converter, each wind turbine is connected to the grid side AC line through the grid connection branch and connected to the grid side AC line to send the electric energy to the AC grid. The output end of the grid side AC is used as the port of the wind turbine. The grid side converter control block diagram of the direct drive wind turbine is shown in FIG. 3. There are several wind turbines in the direct-drive wind farm, and the interaction between the generators will affect the sub/super synchronous oscillation of the direct-drive wind farm of the system. However, the existing stability analysis of the sub/super synchronous oscillation of the grid-connected direct-drive wind farm mainly studies the wind farm as a whole, and mainly analyzes a single operating state. The system stability analysis is not accurate and reliable enough, and the parameter tuning is unreasonable. Considering the impact of interaction between generators on system stability, the present application proposes a direct-drive wind farm parameter tuning method and system considering the interaction between generators. By evaluating the system stability, it can quickly obtain the stable state of the system, realize the early warning of system oscillation, ensure the safe and stable operation, and then tune the parameters according to the stable state to effectively suppress system oscillation.

Embodiment 1

A specific embodiment of this disclosure discloses a direct-drive wind farm parameter tuning method considering the interaction between generators, as shown in FIG. 1, including the following steps:

Step S1: collect initial oscillation current of each direct-drive wind turbine port in the direct-drive wind farm;

Step S2: according to the collected data, take period of dominant oscillation mode as iteration period to calculate overall farm-grid interaction dynamic energy and parameter tuning index of the direct-drive wind farm in the current iteration period;

Step S3: obtaining stability level of the direct-drive wind farm based on the overall farm-grid interaction dynamic energy in the current iteration period; when the system is unstable, optimization model of key control parameters is established with the minimum value of the parameter tuning index in the current iteration period as objective function and range of each key control parameters as constraint condition to achieve the key control parameters tuning of the direct-drive wind farm.

Compared with the prior art, the present application provides a direct-drive wind farm parameter tuning method considering the interaction between generators. In the proposed method the calculation amount is reduced, the calculation accuracy is improved and the reliable operation of the system is ensured by constructing the overall farm-grid interaction dynamic energy and the system parameter tuning index. The system stability analysis result is obtained through the overall farm-grid interaction dynamic energy of the direct-drive wind farm, which can quickly and effectively evaluate the stability level of the grid-connected direct-drive wind farm, realize the early warning of oscillation risk, and ensure the stable and safe operation of the power system. By establishing the optimization model of key control parameters, the system parameters are optimized and tuned, which significantly improves the ability of direct-drive wind farm to suppress oscillation.

Specifically, in step S1, the initial oscillation current is collected through the phase measurement unit (PMU) installed on the ports of each PMSG in the direct-drive wind farm.

During embodiment, in step S2, based on the collected data, the overall farm-grid interaction dynamic energy and parameter tuning index of the direct-drive wind farm in the current iteration period are calculated by taking the period of the dominant oscillation mode as the iteration period, including:

S21: taking the collected data as the initial iteration period data, the generator-grid interaction dynamic energy, the inter-generator coupling interaction dynamic energy and the inter-generator induction interaction dynamic energy of each PMSG in each iteration period are calculated; Among them, the period of dominant oscillation mode is the iteration period;

Specifically, the period of dominant oscillation mode T corresponds to the system oscillation frequency $\omega$, expressed as $$T = \frac{2\pi}{\omega}.$$

S22: based on the generator-grid interaction dynamic energy, the inter-generator coupling interaction dynamic energy and the inter-generator induction interaction dynamic energy of each PMSG in each iteration period, the overall farm-grid interaction dynamic energy of the direct-driven wind farm in the current iteration period is obtained;

S23: based on the generator-grid interaction dynamic energy, the inter-generator coupling interaction dynamic energy of each PMSG in each iteration period, the parameter tuning index of direct-driven wind farm in the current iteration period is obtained.

During implementation, in step S23, the parameter tuning index $\eta_F$ of the direct-drive wind farm in the current iteration period is expressed as:

$$\eta_F = \Delta W_{Fs}^n + \Delta W_{Fcp}^n$$

Where $$\Delta W_{Fs}^n$$

is the overall generator-grid interaction dynamic energy of the direct-drive wind farm after n iteration periods, $$\Delta W_{Fcp}^n$$

is the overall inter-generator coupling interaction dynamic energy of the direct-drive wind farm after n iteration periods, and n is the number of iteration periods from the initial iteration period to the current iteration period.

During implementation, in step S22, the overall farm-grid interaction dynamic energy of the direct-drive wind farm in the current iteration period $$\Delta W_F^n$$

is expressed as:

$$\Delta W_F^n = \Delta W_{Fs}^n + \Delta W_{Fcp}^n + \Delta W_{Fin}^n$$

Where $$\Delta W_{Fin}^n$$

is the overall inter-generator induction interaction dynamic energy of the direct-drive wind farm after n iteration periods.

Specifically, the overall generator-grid interaction dynamic energy of the direct-drive wind farm after n iteration periods $$\Delta W_{Fs}^n$$

is expressed as:

$$\Delta W_{Fs}^n = \sum_{k=1}^{n}\sum_{j=1}^{m}\sum_{\substack{i=1,\\i\neq j}}^{m}\Delta W_{js}^{(k)}.$$

Where $$\Delta W_{js}^{(k)}$$

represents the generator-grid interaction dynamic energy of the jth PMSG in the kth iteration period, and m represents total number of PMSGs.

The overall inter-generator coupling interaction dynamic energy of the direct-drive wind farm after n iteration periods $$\Delta W_{Fcp}^n$$

is expressed as:

$$\Delta W_{Fcp}^n = \sum_{k=1}^{n}\sum_{j=1}^{m}\sum_{\substack{i=1,\\i\neq j}}^{m}\Delta W_{ij\_cp}^{(k)}.$$

Where $$\Delta W_{ij\_cp}^{(k)}$$

represents the inter-generator coupling interaction dynamic energy between the jth PMSG and the ith PMSG in the kth iteration period.

The overall inter-generator induction interaction dynamic energy of the direct-drive wind farm after n iteration periods $$\Delta W_{Fin}^n$$

is expressed as:

$$\Delta W_{Fin}^n = \sum_{k=1}^{n}\sum_{j=1}^{m}\sum_{\substack{i=1,\\i\neq j}}^{m}\Delta W_{ij\_in}^{(k)}$$

Where $$\Delta W_{ij\_in}^{(k)}$$

represents the inter-generator induction interaction dynamic energy between the jth PMSG and the ith PMSG in the kth iteration period.

More specifically, the generator-grid interaction dynamic energy of the jth PMSG in the kth iteration period $$\Delta W_{js}^{(k)}$$

is expressed as:

$$\Delta W_{js}^{(k)} = 0.5\omega\sqrt{(U_{Bd0j} + I_{gd0j}R_s)^2 + [\omega I_{gd0j}(L_s + L_{xj})]^2}$$

$$\sum_{r=1}^{4}\sum_{t=1}^{4}(-1)^r C_{rt}|G_{dr}^{jK}|\left[\begin{array}{c}|M_{jd}^j||G_{dt}^{jK}|\cos(\varphi_{gdr}^{jk} - \varphi_{gdt}^{jk} - \varphi_{d1t}^j) + \\ |M_{jq}^j||G_{qt}^{jK}|\cos(\varphi_{gdr}^j - \varphi_{gqt}^j - \varphi_{q1t}^j)\end{array}\right]\Delta t - 0.5\omega\omega_0$$

$$I_{gd0j}(L_s + L_{xj})\left\{\begin{array}{c}\left(\sum_{r=1,3}\sum_{t=1}^{4}C_{rt}|G_{qr}^{jK}|\left[\begin{array}{c}-|M_{jd}^j||G_{dt}^{jK}|\cos(\varphi_{gqr}^{jk} - \varphi_{gdt}^{jk} - \varphi_{d2t}^j) - \\ |M_{jq}^j||G_{qt}^{jK}|\cos(\varphi_{gqr}^{jk} - \varphi_{gqt}^{jk} - \varphi_{q2t}^j)\end{array}\right]\right) + \\ \sum_{r=2,4}\sum_{t=1}^{4}C_{rt}|G_{qr}^{jK}|\left[\begin{array}{c}|M_{jd}^j||G_{dt}^{jK}|\sin(\varphi_{gqr}^{jk} - \varphi_{gdt}^{jk} - \varphi_{d2t}^j) + \\ |M_{jq}^j||G_{qt}^{jK}|\sin(\varphi_{gqr}^{jk} - \varphi_{gqt}^{jk} - \varphi_{q2t}^j)\end{array}\right]\end{array}\right\}$$

$$\Delta t + 0.5\omega\sqrt{R_s^2 + \omega^2(L_s + L_{xj})^2}$$

$$\left\{\begin{array}{c}\sum_{r=1,3}\sum_{t=1}^{4}(-1)^{t+1}C_{rt}\left[\begin{array}{c}|G_{dr}^{jK}||G_{qt}^{jK}|\cos(\varphi_{gdr}^{jk} - \varphi_{gqt}^{jk} - \varphi_{1t}^j) - \\ |G_{qr}^{jK}||G_{dt}^{jK}|\cos(\varphi_{gqr}^{jk} - \varphi_{gdt}^{jk} - \varphi_{1t}^j)\end{array}\right] + \\ \sum_{r=2,4}\sum_{t=1}^{4}(-1)^t C_{rt}\left[\begin{array}{c}|G_{dr}^{jK}||G_{qt}^{jK}|\sin(\varphi_{gdr}^{jk} - \varphi_{gqt}^{jk} - \varphi_{1t}^j) - \\ |G_{qr}^{jK}||G_{dt}^{jK}|\sin(\varphi_{gqr}^{jk} - \varphi_{gdt}^{jk} - \varphi_{1t}^j)\end{array}\right]\end{array}\right\}\Delta t$$

Where $$\varphi_{d1t}^j = \begin{cases} \sigma_r - \sigma_t + \varphi_c^j + \varphi_{mdj}^j & t = 1, 3 \\ \sigma_r - \sigma_t + \varphi_c^j + \varphi_{mdj}^j + 90^\circ & t = 2, 4 \end{cases};$$

$$\varphi_{q1t}^j = \begin{cases} \sigma_r - \sigma_t + \varphi_c^j + \varphi_{mqj}^j & t = 1, 3 \\ \sigma_r - \sigma_t + \varphi_c^j + \varphi_{mqj}^j + 90^\circ & t = 2, 4 \end{cases}$$

$$\varphi_{d2t}^{j} = \begin{cases} \sigma_r - \sigma_t + \varphi_{mdj}^{j} + 90° & t = 1, 3 \\ \sigma_r - \sigma_t + \varphi_{mdj}^{j} & t = 2, 4 \end{cases};$$

$$\varphi_{q2t}^{j} = \begin{cases} \sigma_r - \sigma_t + \varphi_{mqj}^{j} + 90° & t = 1, 3 \\ \sigma_r - \sigma_t + \varphi_{mqj}^{j} & t = 2, 4 \end{cases}$$

$$\varphi_{1t}^{j} = \begin{cases} \sigma_r - \sigma_t - \arctan[R_s/(\omega L_s + \omega L_{xj})] & t = 1, 3 \\ \sigma_r - \sigma_t + \arctan[(\omega L_s + \omega L_{xj})/R_s] & t = 2, 4 \end{cases};$$

$$\varphi_c^{j} = \begin{cases} \arctan[(U_{Bd0j} + I_{gd0j}R_s)/\omega I_{gd0j}(L_s + L_{xj})] & r = 1, 3 \\ -\arctan[\omega I_{gd0j}(L_s + L_{xj})/(U_{Bd0j} + I_{gd0j}R_s)] & r = 2, 4 \end{cases}$$

$$\sigma_r = \begin{cases} \varphi_{sj} & r = 1, 2 \\ \varphi_{si} & r = 3, 4 \end{cases};$$

$$\sigma_t = \begin{cases} \varphi_{sj} & t = 1, 2 \\ \varphi_{si} & t = 3, 4 \end{cases}$$

$$C_{rt} = \begin{cases} I_{sj}I_{sj} & r, t \in [1, 2] \\ I_{si}I_{si} & r, t \in [3, 4] ; \\ I_{sj}I_{si} & others \end{cases}$$

$$\begin{cases} M_{jd}^{j} = M_{pllj}(\omega_0 L_s + \omega_0 L_{xj}) \\ M_{jq}^{j} = M_{pllj}(R_s + sL_s + sL_{xj}) \\ M_{pllj} = \dfrac{sK_{P\theta}^{j} + K_{I\theta}^{j}}{s^2} \end{cases};$$

$$\begin{pmatrix} G_{d1}^{jK} & G_{d2}^{jK} & G_{d3}^{jK} & G_{d4}^{jK} \\ G_{q1}^{jK} & G_{q2}^{jK} & G_{q3}^{jK} & G_{q4}^{jK} \\ G_{d1}^{iK} & G_{d2}^{iK} & G_{d3}^{iK} & G_{d4}^{iK} \\ G_{q1}^{iK} & G_{q2}^{iK} & G_{q3}^{iK} & G_{q4}^{iK} \end{pmatrix} = \begin{pmatrix} G_{d1}^{j} & G_{d2}^{j} & G_{d3}^{j} & G_{d4}^{j} \\ G_{q1}^{j} & G_{q2}^{j} & G_{q3}^{j} & G_{q4}^{j} \\ G_{d1}^{i} & G_{d2}^{i} & G_{d3}^{i} & G_{d4}^{i} \\ G_{q1}^{i} & G_{q2}^{i} & G_{q3}^{i} & G_{q4}^{i} \end{pmatrix}^{k};$$

$$\begin{cases} G_{d1}^{j} = F_d^{j}[U_{Bd0j} + I_{gd0j}(R_s + sL_s + sL_{xj})] \\ G_{d2}^{j} = F_d^{j}I_{gd0j}\omega_0(-L_s - L_{xj}) \\ G_{d3}^{j} = F_d^{j}I_{gd0j}(R_s + sL_s) \\ G_{d4}^{j} = F_d^{j}(-I_{gd0j}\omega_0 L_s) \end{cases};$$

$$\begin{cases} G_{q1}^{j} = F_q^{j}(R_s + sL_s + sL_{xj}) \\ G_{q2}^{j} = F_q^{j}\omega_0(-L_s - L_{xj}) \\ G_{q3}^{j} = F_q^{j}(R_s + sL_s) \\ G_{q4}^{j} = F_q^{j}(-\omega_0 L_s) \end{cases};$$

$$F_d^{j} = \dfrac{\left(K_P^{j} + \dfrac{K_I^{j}}{s}\right)\left(K_{Pu}^{j} + \dfrac{K_{Iu}^{j}}{s}\right)}{K_P^{j} + \dfrac{K_I^{j}}{s} + R_{1j} + sL_{1j}} \dfrac{1}{sC_{dc}U_{dc0}};$$

$$F_q^{j} = -\dfrac{\left(K_P^{j} + \dfrac{K_I^{j}}{s}\right)\omega_0 C_f}{K_P^{j} + \dfrac{K_I^{j}}{s} + R_{1j} + sL_{1j}};$$

Where $\omega$ is sub/super synchronous oscillation frequency in dq axis, $\omega_0$ is angular frequency of grid, $U_{Bd0j}$ and $I_{gd0j}$ are steady-state values of d-axis voltage and current at port of the jth PMSG respectively, $R_s$ and $L_s$ are resistance and inductance of AC line, $L_{xj}$ is inductance of grid-connecting line, $$\varphi_{gdr}^{jk}, \varphi_{gdt}^{jk}, \varphi_{gqr}^{jk} \text{ and } \varphi_{gqt}^{jk},$$

are phases of $$G_{dr}^{jK}, G_{dt}^{jK}, G_{qr}^{jK} \text{ and } G_{qt}^{jK}$$

respectively, $\varphi_{sj}$ and $\varphi_{si}$ are initial phase of initial sub/super synchronous current of the jth and ith PMSG respectively, $I_{sj}$ and $I_{si}$ are amplitudes of the initial sub/super synchronous current of the jth and ith PMSG respectively, s is Laplace operator, $$\varphi_{mdj}^{j} \text{ and } \varphi_{mqj}^{j}$$

are phases of $$M_{jd}^{j} \text{ and } M_{jq}^{j}$$

respectively, $$K_P^{j} \text{ and } K_I^{j}$$

are current loop proportion and integral gains of the jth PMSG respectively, $$K_{P\theta}^{j} \text{ and } K_{I\theta}^{j}$$

are proportional and integral gains of phase-locked loop of the jth PMSG respectively, $$K_{Pu}^{j} \text{ and } K_{Iu}^{j}$$

are proportional and integral gains of the voltage outer loop of the jth PMSG respectively, $R_{1j}$ and $L_{1j}$ are equivalent resistance and inductance of filter respectively, $C_{dc}$ is DC capacitance, $U_{dc0}$ is steady-state value of DC bus voltage, $C_f$ is filter capacitor.

More specifically, the inter-generator coupling interaction dynamic energy between the jth PMSG and the ith PMSG in the kth iteration period $$\Delta W_{ij\_cp}^{(k)}$$

is expressed as:

$$\Delta W_{ij\_cp}^{(k)} = 0.5\omega\sqrt{(U_{Bd0j} + I_{gd0j}R_s)^2 + (\omega I_{gd0j}(L_s + L_{xj}))^2}$$

$$\sum_{r=1}^{4}\sum_{t=1}^{4}(-1)^r C_{rt}|G_{dr}^{jK}|\left[\begin{array}{c} |M_{id}^{j}||G_{dt}^{iK}|\cos(\varphi_{gdr}^{jk} - \varphi_{gdt}^{ik} - \varphi_{d3t}^{j}) + \\ |M_{iq}^{j}||G_{qt}^{iK}|\cos(\varphi_{gdr}^{jk} - \varphi_{gqt}^{ik} - \varphi_{q3t}^{j}) \end{array}\right]\Delta t - 0.5\omega\omega_0$$

-continued $$I_{gd0j}(L_s + L_{xj}) \left\{ \sum_{r=1,3}\sum_{t=1}^{4} C_{rt}|G_{qr}^{jK}| \left[ \begin{array}{l} -|M_{id}^{j}||G_{dt}^{iK}|\cos(\varphi_{gqr}^{jk} - \varphi_{gdt}^{ik} - \varphi_{d4t}^{j}) - \\ |M_{iq}^{j}||G_{qt}^{iK}|\cos(\varphi_{gqr}^{jk} - \varphi_{gqt}^{ik} - \varphi_{q4t}^{j}) \end{array} \right] + \right. \\ \left. \sum_{r=2,4}\sum_{t=1}^{4} C_{rt}|G_{qr}^{jK}| \left[ \begin{array}{l} |M_{id}^{j}||G_{dt}^{iK}|\sin(\varphi_{gqr}^{jk} - \varphi_{gdt}^{ik} - \varphi_{d4t}^{j}) + \\ |M_{iq}^{j}||G_{qt}^{iK}|\sin(\varphi_{gqr}^{jk} - \varphi_{gqt}^{ik} - \varphi_{q4t}^{j}) \end{array} \right] \right\}$$

$$\Delta t + 0.5\omega\sqrt{(I_{gd0j}R_s)^2 + (\omega I_{gd0j}L_s)^2}$$

$$\sum_{r=1}^{4}\sum_{t=1}(-1)^r C_{rt}|G_{dr}^{iK}| \left[ \begin{array}{l} |M_{id}^{j}||G_{dt}^{jK}|\cos(\varphi_{gdr}^{ik} - \varphi_{gdt}^{jk} - \varphi_{d5t}^{j}) + \\ |M_{iq}^{j}||G_{qt}^{jK}|\cos(\varphi_{gdr}^{ik} - \varphi_{gqt}^{jk} - \varphi_{q5t}^{j}) \end{array} \right] \Delta t -$$

$$0.5\omega\omega_0 I_{gd0j}L_s \left\{ \sum_{r=1,3}\sum_{t=1}^{4} C_{rt}|G_{qr}^{iK}| \left[ \begin{array}{l} -|M_{jd}^{j}||G_{dt}^{jK}|\cos(\varphi_{gqr}^{ik} - \varphi_{gdt}^{jk} - \varphi_{d2t}^{j}) - \\ |M_{jq}^{j}||G_{qt}^{jK}|\cos(\varphi_{gqr}^{ik} - \varphi_{gqt}^{jk} - \varphi_{q2t}^{j}) \end{array} \right] + \right. \\ \left. \sum_{r=2,4}\sum_{t=1}^{4} C_{rt}|G_{qr}^{iK}| \left[ \begin{array}{l} |M_{jd}^{j}||G_{dt}^{jK}|\sin(\varphi_{gqr}^{ik} - \varphi_{gdt}^{jk} - \varphi_{d2t}^{j}) + \\ |M_{jq}^{j}||G_{qt}^{jK}|\sin(\varphi_{gqr}^{ik} - \varphi_{gqt}^{jk} - \varphi_{q2t}^{j}) \end{array} \right] \right\}$$

$$\Delta t + 0.5\omega\sqrt{R_s^2 + (\omega L_s)^2}$$

$$\left\{ \sum_{r=1,3}\sum_{t=1}^{4}(-1)^{t+1} C_{rt} \left[ \begin{array}{l} |G_{dr}^{jK}||G_{qt}^{iK}|\cos(\varphi_{gqr}^{jk} - \varphi_{gqt}^{ik} - \varphi_{2t}^{j}) - \\ |G_{qr}^{jK}||G_{dt}^{iK}|\cos(\varphi_{gqr}^{jk} - \varphi_{gdt}^{ik} - \varphi_{2t}^{j}) \end{array} \right] + \right. \\ \left. \sum_{r=2,4}\sum_{t=1}^{4}(-1)^r C_{rt} \left[ \begin{array}{l} |G_{dr}^{jK}||G_{qt}^{iK}|\sin(\varphi_{gdr}^{jk} - \varphi_{gqt}^{ik} - \varphi_{2t}^{j}) - \\ |G_{qr}^{jK}||G_{dt}^{iK}|\sin(\varphi_{gqr}^{jk} - \varphi_{gdt}^{ik} - \varphi_{2t}^{j}) \end{array} \right] \right\} \Delta t +$$

$$0.5\omega\omega_0 L_s \left\{ \sum_{r=1,3}\sum_{t=1}^{4} C_{rt} \left[ \begin{array}{l} |G_{dr}^{jK}||G_{dt}^{iK}|\sin(\varphi_{gdr}^{jk} - \varphi_{gdt}^{ik} - \varphi_{d6t}^{j}) - \\ |G_{qr}^{jK}||G_{qt}^{iK}|\sin(\varphi_{gqr}^{jk} - \varphi_{gqt}^{ik} - \varphi_{d6t}^{j}) \end{array} \right] + \right. \\ \left. \sum_{r=2,4}\sum_{t=1}^{4} C_{rt} \left[ \begin{array}{l} |G_{dr}^{jK}||G_{dt}^{iK}|\cos(\varphi_{gdr}^{jk} - \varphi_{gdt}^{ik} - \varphi_{d6t}^{j}) - \\ |G_{qr}^{jK}||G_{qt}^{iK}|\cos(\varphi_{gqr}^{jk} - \varphi_{gqt}^{ik} - \varphi_{d6t}^{j}) \end{array} \right] \right\} \Delta t \text{ where}$$

$$\varphi_{d3t}^{j} = \begin{cases} \sigma_r - \sigma_t + \varphi_c^{j} + \varphi_{mdi}^{j} & t = 1, 3 \\ \sigma_r - \sigma_t + \varphi_c^{j} + \varphi_{mdi}^{j} + 90° & t = 2, 4 \end{cases};$$

$$\varphi_{q3t}^{j} = \begin{cases} \sigma_r - \sigma_t + \varphi_c^{j} + \varphi_{mqi}^{j} & t = 1, 3 \\ \sigma_r - \sigma_t + \varphi_c^{j} + \varphi_{mqi}^{j} + 90° & t = 2, 4 \end{cases}$$

$$\varphi_{d4t}^{j} = \begin{cases} \sigma_r - \sigma_t + \varphi_{mdi}^{j} + 90° & t = 1, 3 \\ \sigma_r - \sigma_t + \varphi_{mdi}^{j} & t = 2, 4 \end{cases};$$

$$\varphi_{q4t}^{j} = \begin{cases} \sigma_r - \sigma_t + \varphi_{mqi}^{j} + 90° & t = 1, 3 \\ \sigma_r - \sigma_t + \varphi_{mqi}^{j} & t = 2, 4 \end{cases}$$

$$\varphi_{d5t}^{j} = \begin{cases} \sigma_r - \sigma_t + \varphi_p^{j} + \varphi_{mdj}^{j} & t = 1, 3 \\ \sigma_r - \sigma_t + \varphi_p^{j} + \varphi_{mdj}^{j} + 90° & t = 2, 4 \end{cases};$$

$$\varphi_{q5t}^{j} = \begin{cases} \sigma_r - \sigma_t + \varphi_p^{j} + \varphi_{mqj}^{j} & t = 1, 3 \\ \sigma_r - \sigma_t + \varphi_p^{j} + \varphi_{mqj}^{j} + 90° & t = 2, 4 \end{cases}$$

$$\varphi_{d6t}^{j} = \begin{cases} \sigma_r - \sigma_t & t = 1, 3 \\ \sigma_r - \sigma_t + 90° & t = 2, 4 \end{cases}$$

$$\varphi_{2t}^{j} = \begin{cases} \sigma_r - \sigma_t - \arctan[R_s/(\omega L_s)] & t = 1, 3 \\ \sigma_r - \sigma_t + \arctan[(\omega L_s)/R_s] & t = 2, 4 \end{cases};$$

$$\varphi_p^{j} = \begin{cases} \arctan[R_s/(\omega L_s)] & r = 1, 3 \\ -\arctan[(\omega L_s)/R_s] & r = 2, 4 \end{cases}; \begin{cases} M_{id}^{j} = M_{plij}\omega_0 L_s \\ M_{iq}^{j} = M_{plij}(R_s + sL_s) \end{cases}.$$

More specifically, the inter-generator induction interaction dynamic energy between the jth PMSG and the ith PMSG in the kth iteration period $$\Delta W_{ij\_in}^{(k)}$$

is expressed as:

$$\Delta W_{ij\_in}^{(k)} = 0.5\omega I_{gd0j}\sqrt{R_s^2 + (\omega L_s)^2}$$

$$\sum_{r=1}^{4}\sum_{t=1}^{4}(-1)^r C_{rt}|G_{dr}^{iK}| \left[ \begin{array}{l} |M_{id}^{j}||G_{dt}^{iK}|\cos(\varphi_{gdr}^{ik} - \varphi_{gdt}^{ik} - \varphi_{d7t}^{j}) + \\ |M_{iq}^{j}||G_{qt}^{iK}|\cos(\varphi_{gdr}^{ik} - \varphi_{gqt}^{ik} - \varphi_{q7t}^{j}) \end{array} \right] \Delta t - 0.5\omega\omega_0 I_{gd0j}$$

$$L_s \left\{ \sum_{r=1,3}\sum_{t=1}^{4} C_{rt}|G_{qr}^{iK}| \left[ \begin{array}{l} -|M_{id}^{j}||G_{dt}^{iK}|\cos(\varphi_{gqr}^{ik} - \varphi_{gdt}^{ik} - \varphi_{d2t}^{j}) - \\ |M_{iq}^{j}||G_{qt}^{iK}|\cos(\varphi_{gqr}^{ik} - \varphi_{gqt}^{ik} - \varphi_{q2t}^{j}) \end{array} \right] + \right. \\ \left. \sum_{r=2,4}\sum_{t=1}^{4} C_{rt}|G_{qr}^{iK}| \left[ \begin{array}{l} |M_{id}^{j}||G_{dt}^{iK}|\sin(\varphi_{gqr}^{ik} - \varphi_{gdt}^{ik} - \varphi_{d2t}^{j}) + \\ |M_{iq}^{j}||G_{qt}^{iK}|\sin(\varphi_{gqr}^{ik} - \varphi_{gqt}^{ik} - \varphi_{q2t}^{j}) \end{array} \right] \right\} \Delta t \text{ where}$$

$$\varphi_{d7t}^{j} = \begin{cases} \sigma_r - \sigma_t + \varphi_p^{j} + \varphi_{mdi}^{j} & t = 1, 3 \\ \sigma_r - \sigma_t + \varphi_p^{j} + \varphi_{mdi}^{j} + 90° & t = 2, 4 \end{cases}$$

$$\varphi_{q7t}^{j} = \begin{cases} \sigma_r - \sigma_t + \varphi_p^{j} + \varphi_{mqi}^{j} & t = 1, 3 \\ \sigma_r - \sigma_t + \varphi_p^{j} + \varphi_{mqi}^{j} + 90° & t = 2, 4 \end{cases}.$$

It should be noted that in Step S21, the generator-grid interaction dynamic energy, inter-generator coupling interaction dynamic energy and inter-generator induction interaction dynamic energy of each PMSG in each iteration period are calculated based on the following process:

S211: taking the data collected in step S1 as the initial iteration period data, the induced oscillation current of each PMSG in the kth iteration period is calculated iteratively. The d-axis and q-axis components of the induced oscillation current of PMSG in the kth iteration period are respectively expressed as:

$$\begin{pmatrix} \Delta i_{gdj}^{(k)} \\ \Delta i_{gqj}^{(k)} \end{pmatrix} = \begin{pmatrix} G_{d1}^{j} & G_{d2}^{j} & G_{d3}^{j} & G_{d4}^{j} \\ G_{q1}^{j} & G_{q2}^{j} & G_{q3}^{j} & G_{q4}^{j} \end{pmatrix} \begin{pmatrix} \Delta i_{gdj}^{(g,k-1)} \\ \Delta i_{gqj}^{(g,k-1)} \\ \Delta i_{gdi}^{(g,k-1)} \\ \Delta i_{gqi}^{(g,k-1)} \end{pmatrix} + \begin{pmatrix} H_d^{j} \\ H_q^{j} \end{pmatrix} \Delta\theta_{plij}^{(k-1)} \text{ where}$$

$$\begin{cases} G_{d1}^{j} = F_d^{j}[U_{Bd0j} + I_{gd0j}(R_s + sL_s + sL_{xj})] \\ G_{d2}^{j} = F_d^{j} I_{gd0j}\omega_0(-L_s - L_{xj}) \\ G_{d3}^{j} = F_d^{j} I_{gd0j}\omega_0(R_s + sL_s) \\ G_{d4}^{j} = F_d^{j}(-I_{gd0j}\omega_0 L_s) \end{cases},$$

$$\begin{cases} G_{q1}^{j} = F_q^{j}(R_s + sL_s + sL_{xj}) \\ G_{q2}^{j} = F_q^{j}\omega_0(-L_s - L_{xj}) \\ G_{q3}^{j} = F_q^{j}(R_s + sL_s) \\ G_{q4}^{j} = F_q^{j}(-\omega_0 L_s) \end{cases}$$

$$F_d^{j} = \frac{\left(K_P^{j} + \frac{K_I^{j}}{s}\right)\left(K_{Pu}^{j} + \frac{K_{Iu}^{j}}{s}\right)}{K_P^{j} + \frac{K_I^{j}}{s} + R_{1j} + sL_{1j}} \frac{1}{sC_{dc}U_{dc0}}, F_d^{j} = -\frac{\left(K_P^{j} + \frac{K_I^{j}}{s}\right)\omega_0 C_f}{K_P^{j} + \frac{K_I^{j}}{s} + R_{1j} + sL_{1j}}$$

$$\begin{cases} H_d^{j} = F_d^{j}(U_{Bd0j}I_{gd0j} + U_{Bq0j}I_{gd0j}) \\ H_d^{j} = F_d^{j} U_{Bd0j} \end{cases}$$

$$\begin{pmatrix} \Delta i_{gdj}^{(k)} \\ \Delta i_{gqj}^{(k)} \\ \Delta i_{gdi}^{(k)} \\ \Delta i_{gqi}^{(k)} \end{pmatrix} =$$

$$\begin{pmatrix} G_{d1}^{j} & G_{d2}^{j} & G_{d3}^{j} & G_{d4}^{j} \\ G_{q1}^{j} & G_{q2}^{j} & G_{q3}^{j} & G_{q4}^{j} \\ G_{d1}^{i} & G_{d2}^{i} & G_{d3}^{i} & G_{d4}^{i} \\ G_{q1}^{i} & G_{q2}^{i} & G_{q3}^{i} & G_{q4}^{i} \end{pmatrix} \begin{pmatrix} \Delta i_{gdj}^{(0)} \\ \Delta i_{gqj}^{(0)} \\ \Delta i_{gdi}^{(0)} \\ \Delta i_{gqi}^{(0)} \end{pmatrix} = \begin{pmatrix} G_{d1}^{jK} & G_{d2}^{jK} & G_{d3}^{jK} & G_{d4}^{jK} \\ G_{q1}^{jK} & G_{q2}^{jK} & G_{q3}^{jK} & G_{q4}^{jK} \\ G_{d1}^{iK} & G_{d2}^{iK} & G_{d3}^{iK} & G_{d4}^{iK} \\ G_{q1}^{iK} & G_{q2}^{iK} & G_{q3}^{iK} & G_{q4}^{iK} \end{pmatrix} \begin{pmatrix} \Delta i_{gdj}^{(0)} \\ \Delta i_{gqj}^{(0)} \\ \Delta i_{gdi}^{(0)} \\ \Delta i_{gqi}^{(0)} \end{pmatrix},$$

Where $$\Delta i_{gdj}^{(k)} \text{ and } \Delta i_{gqj}^{(k)}$$

are dq axis component of the kth induced oscillation current of the jth PMSG respectively, $U_{Bq0j}$ and $I_{gq0j}$ are steady-state value of voltage and current of q-axis of the jth PMSG, $$\Delta \theta_{plij}^{(k-1)}$$

is the k-lth phase-locked angle of the jth PMSG, wo is angular frequency of the grid, $$\Delta i_{gdj}^{(g,k-1)}, \Delta i_{gqj}^{(g,k-1)}, \Delta i_{gdi}^{(g,k-1)} \text{ and } \Delta i_{gqi}^{(g,k-1)}$$

are dq axis component of the kth induced oscillation current of the jth and ith PMSG respectively, superscript "g" represents variables of the AC grid in dq coordinate system, i and j are selected arbitrarily and i≠j, $$\Delta i_{gdi}^{(k)} \text{ and } \Delta i_{gqi}^{(k)}$$

are dq axis component of the kth induced oscillation current of the ith PMSG respectively, $$\Delta i_{gdj}^{(0)}, \Delta i_{gqj}^{(0)}, \Delta i_{gdi}^{(0)} \text{ and } \Delta i_{gqi}^{(0)}$$

are dq axis components of the oscillation current induced by the jth and ith PMSG in the 0th iteration period (initial iteration period), respectively.

S212: According to the dq axis components of the induced oscillation current of PMSG in the kth iteration period, self/interaction phase-locked loop, self/interaction active power and self/interaction oscillation voltage of each PMSG in the kth iteration period are obtained, which are respectively expressed as:

$$\begin{cases} \Delta \theta_{pll\_jj}^{(k)} = M_{jd}^{j} \Delta i_{gdj}^{(k)} + M_{jq}^{j} \Delta i_{gqj}^{(k)} \\ \Delta \theta_{pll\_ij}^{(k)} = M_{id}^{j} \Delta i_{gdi}^{(k)} + M_{iq}^{j} \Delta i_{gqi}^{(k)} \end{cases}$$

$$\begin{cases} \Delta P_{g\_jj}^{(k)} = U_{Bd0j} \Delta i_{gdj}^{(k)} + I_{gd0j} \left[ (R_s + sL_s + sL_{xj}) \Delta i_{gdj}^{(k)} - \omega_0 (L_s + L_{xj}) \Delta i_{gqi}^{(k)} \right] \\ \Delta P_{g\_ij}^{(k)} = I_{gd0j} \Delta u_{Bd\_ij}^{(k)} = I_{gd0j} \left[ (R_s + sL_s) \Delta i_{gdi}^{(k)} - \omega_0 L_s \Delta i_{gqi}^{(k)} \right] \end{cases}$$

$$\begin{cases} \Delta u_{Bd\_jj}^{(k)} = (R_s + sL_s + sL_{xj}) \Delta i_{gdj}^{(k)} - \omega_0 (L_s + L_{xj}) \Delta i_{gqj}^{(k)} \\ \Delta u_{Bq\_jj}^{(k)} = (R_s + sL_s + sL_{xj}) \Delta i_{gqj}^{(k)} + \omega_0 (L_s + L_{xj}) \Delta i_{gdj}^{(k)} \end{cases} \text{where}$$

$$\begin{cases} \Delta u_{Bd\_ij}^{(k)} = (R_s + sL_s) \Delta i_{gdi}^{(k)} - \omega_0 L_s \Delta i_{gqi}^{(k)} \\ \Delta u_{Bq\_ij}^{(k)} = (R_s + sL_s) \Delta i_{gqi}^{(k)} + \omega_0 L_s \Delta i_{gdi}^{(k)} \end{cases}$$

$$\begin{cases} M_{jd}^{j} = M_{plij}(\omega_0 L_s + \omega_0 L_{xj}) \\ M_{jq}^{j} = M_{plii}(R_s + sL_s + sL_{xj}) \end{cases}, \begin{cases} M_{id}^{j} = M_{plij}\omega_0 L_s \\ M_{iq}^{j} = M_{plij}(R_s + sL_s) \end{cases}$$

$$M_{plij} = \frac{sK_{P\theta}^{j} + K_{I\theta}^{j}}{s^2}$$

Where $$\Delta \theta_{pll\_jj}^{(k)}$$

is the self phase-locked loop angle of the jth PMSG in the kth iteration period, $$\Delta \theta_{pll\_ij}^{(k)}$$

is the interaction phase-locked loop angle between the jth PMSG and the ith PMSG in the kth iteration period, i.e., the part of phase-locked loop angle of the jth PMSG affected by the ith PMSG, $$\Delta P_{g\_jj}^{(k)}$$

is the self active power of the jth PMSG in the kth iteration period, $$\Delta P_{g\_ij}^{(k)}$$

is the interaction active power between the jth PMSG and the ith PMSG in the kth iteration period, $$\Delta u_{Bd\_jj}^{(k)} \text{ and } \Delta u_{Bq\_jj}^{(k)}$$

are dq axis components of the self oscillation voltage of the jth PMSG in the kth iteration period respectively, $$\Delta u_{Bd\_ij}^{(k)} \text{ and } \Delta u_{Bq\_ij}^{(k)}$$

are dq axis components of the interaction oscillation voltage of the jth PMSG in the kth iteration period respectively.

S213: according to the dynamic energy model of the direct-drive wind farm, time domain expressions of the generator-grid interaction energy, the inter-generator coupling energy and the inter-generator induction energy of the direct-drive wind farm are obtained as follows:

The time domain expression of the generator-grid interaction dynamic energy of the jth PMSG in the kth iteration period $$\Delta W_{js}^{(k)}(t)$$

is:

$$\Delta W_{js}^{(k)}(t) = \int_{t}^{t+T} \Delta P_{g\_jj}^{(k)} d\Delta \theta_{pll\_jj}^{(k)} + \int_{t}^{t+T} \Delta i_{gdj}^{(k)} d\Delta u_{Bq\_jj}^{(k)} - \int_{t}^{t+T} \Delta i_{gqj}^{(k)} d\Delta u_{Bq\_jj}^{(k)}$$

The time domain expression of the inter-generator coupling interaction dynamic energy between the jth PMSG and the ith PMSG in the kth iteration period $$\Delta W_{ij\_cp}^{(k)}(t)$$

is:

$$\Delta W_{ij\_cp}^{(k)}(t) = \int_t^{t+T} \Delta P_{g\_ij}^{(k)} d\Delta \theta_{pll\_ij}^{(k)} +$$

$$\int_t^{t+T} \Delta P_{g\_ij}^{(k)} d\Delta \theta_{pll\_ij}^{(k)} + \int_t^{t+T} \Delta i_{gdj}^{(k)} d\Delta u_{Bq\_ij}^{(k)} - \int_t^{t+T} \Delta i_{gqj}^{(k)} d\Delta u_{Bd\_ij}^{(k)}$$

The time domain expression of the inter-generator induction interaction dynamic energy between the jth PMSG and the ith PMSG in the kth iteration period $$\Delta W_{ij\_in}^{(k)}(t)$$

is:

$$\Delta W_{ij\_in}^{(k)}(t) = \int_t^{t+T} \Delta P_{g\_ij}^{(k)} d\Delta \theta_{pll\_ij}^{(k)}$$

S214: substitute each iteration amount obtained in step S211 and step S212 into each time domain energy expression in step S213 and extract aperiodic components, the generator-grid interaction dynamic energy $$\Delta W_{js}^{(k)},$$

inter-generator coupling interaction dynamic energy $$\Delta W_{ij\_cp}^{(k)}$$

and inter-generator induction interaction dynamic energy $$\Delta W_{ij\_in}^{(k)}$$

in each iteration period are obtained.

During implementation, the stability level of the direct-drive wind farm is obtained based on the overall farm-grid interaction dynamic energy $$\Delta W_F^n$$

of the current iteration period, including:
When $$\Delta W_F^n < 0,$$

the direct-drive wind farm has a positive damping effect on oscillation, and the system is in a stable state. The smaller the value, the higher the stability level;
When $$\Delta W_F^n = 0,$$

the direct-drive wind farm has no damping effect on the oscillation, and the system is in a critical stable state;
When $$\Delta W_F^n > 0,$$

the direct-drive wind farm has a negative damping effect on the oscillation, and the system oscillation divergence will be completely unstable.

Understandably, according to the positive and negative of the overall farm-grid interaction dynamic energy, the stable state of the system is accurately quantified, evaluation result of the stability level is given, early warning of oscillation risk is realized, and stable and safe operation of the power system is ensured.

During implementation, the key control parameters include: current loop proportional gain, phase-locked loop proportional gain, grid-connected line inductance, active current reference value, and key control parameter optimization model is expressed as:

$$\begin{cases} \min_\alpha S_n = \eta_F(\alpha) \\ \text{s.t. } P(K) = 0 \\ K_{P\_min}^j \leq K_P^j \leq K_{P\_max}^j \\ K_{P\theta\_min}^j \leq K_{P\theta}^j \leq K_{P\theta\_max}^j \\ L_{xj\_min} \leq L_{xj} \leq L_{xj\_max} \\ i_{gdj\_min}^* \leq i_{gdj}^* \leq i_{gdj\_max}^* \\ \alpha = \left[ K_P^j, K_{P\theta}^j, L_{xj}, i_{gdj}^* \right] \end{cases}$$

Where $S_n$ is the objective function of the current iteration period, $\eta_F$ is the parameter tuning index of the current iteration period, P(K)=0 means that the power flow meets the static security and stability conditions, that is, the power distribution of the power system meets the static security and stability conditions;

$$K_{P\_min}^j \text{ and } K_{P\_max}^k$$

are the lower and upper limit of the current loop proportional gain $$K_P^j$$

of the jth PMSG respectively;

$$K_{P\theta\_min}^j \text{ and } K_{P\theta\_max}^j$$

are the lower and upper limit of the PLL proportion gain $$K_{P\theta}^{j}$$

of the jth PMSG respectively; $L_{xj\_min}$ and $L_{xj\_max}$ are the lower and upper limit of the integration distance of the jth PMSG respectively;

$$i_{gdj\_min}^{*} \text{ and } i_{gdj\_max}^{*}$$

are the lower and upper limit of the reference value of active current of the jth PMSG respectively; $\alpha$ is set of decision variables. The upper and lower limits of key control parameters are set according to specific requirements. Understandably, the inductance of the grid connected line is proportional to the access distance, and the analysis of the grid connected inductance is the analysis of the access distance. The change of the reference value of active current $$i_{gdj}^{*}$$

affects the steady-state value $I_{gd0j}$ of the port current of the corresponding PMSG, thus achieving the constraint of $I_{gd0j}$. The decision variables a represent the four key control parameters to be optimized.

It should be noted that, when selecting the objective function of the optimization model of key control parameters, the influence on the stability of the inter-generator induction interaction dynamic energy is very small, so the influence on the key control parameters tuning is very small. It is ignored when constructing the objective function, which simplifies the calculation process and improves the calculation efficiency.

Specifically, when determining the key control parameters, it is considered that when the proportional gain of the current loop, the proportional gain of the phase-locked loop and the inductance of the grid connected line increase, the generator-grid interaction dynamic energy will increase and the inter-generator coupling dynamic energy will decrease, which has opposite effects on the generator-grid interaction dynamic energy and the inter-generator coupling dynamic energy in the direct-drive wind farm. The adjustment of the objective function is achieved through the game between the generator-grid interaction dynamic energy will increase and the inter-generator coupling dynamic energy, as well as considering that when the reference value of active current increases, the generator-grid interaction dynamic energy will increase and the inter-generator coupling dynamic energy will increase. Through optimization, the active power of each PMSG can be balanced. Therefore, the current loop proportional gain, phase-locked loop proportional gain, grid connected line inductance, and the reference value of active current are taken as the key control parameters.

Understandably, the optimization results of key parameters affecting the system stability are obtained through the optimization model of key control parameters, which provides guidance for the subsequent optimization and the key control parameters tuning.

Preferably, based on the optimization model of key control parameters, the optimal key control parameter values are determined through optimization algorithms, such as Particle Swarm Optimization (PSO), to achieve the optimal sub/super synchronous oscillation suppression of the direct-drive wind farm.

Embodiment 2

The specific embodiment 2 of the present application provides a direct-drive wind farm parameter tuning system considering the interaction between generators, including data acquisition module, system stability evaluation module and parameter optimization module.

The data acquisition module is used to collect the initial oscillation current of each PMSG port in the direct-driven wind farm.

The system stability evaluation module is used to, according to the collected data, take the period of the dominant oscillation mode as the iteration period to calculate the overall farm-grid interaction dynamic energy, and parameter tuning index of the direct-drive wind farm in the current iteration period. Obtaining the stability level of the direct-drive wind farm based on the overall farm-grid interaction dynamic energy in the current iteration period.

The parameter optimization module is used to, according to the result of system stability assessment, when the system is unstable, the optimization model of key control parameters is established with the minimum value of the parameter tuning index in the current iteration period as the objective function and the range of each key control parameters as the constraint condition to achieve the key control parameters tuning of the direct-drive wind farm.

The specific implementation process of this embodiment of the application can be referred to the above embodiment of the method, which will not be repeated here.

Since the principle of this embodiment is the same as that of the above embodiment of the method, the system also has the corresponding technical effects of the above method embodiment.

Embodiment 3

In order to verify the correctness of the direct-drive wind farm parameter tuning method and system considering the interaction between generators provided by embodiments 1 and 2 of the application, this embodiment tests and verifies the scheme in the above embodiments. In this embodiment, a grid-connected type-3 direct-drive wind farm is built from the simulation level. Considering the applicability of the application, this embodiment generates different oscillation cases for the system according to different types of disturbances, including self-excited oscillation, subsynchronous forced oscillation and sub/super synchronous forced oscillation. The system simulation structure diagram is shown in FIG. 2, the grid side converter control block diagram of PMSG is shown in FIG. 3, the simulation model is built on the RT-LAB platform, and the parameters of the grid-connected direct-drive wind farm are shown in Table 1.

TABLE 1

PARAMETERS OF DIRECT-DRIVE WIND
FARM GRID-CONNECTED SYSTEM

| Parameter | Symbol | Value |
|---|---|---|
| Rated power | $P_r$/MW | 1.5 |
| Current loop parameter | $K_{1P}$, $K_{2P}$, $K_{3P}$ | 0.5e−3, 0.53e−3, 0.55e−3 |
| PLL parameter | $K_{1P\theta}$, $K_{2P\theta}$, $K_{3P\theta}$ | 0.63, 0.67, 0.71 |

TABLE 1-continued

PARAMETERS OF DIRECT-DRIVE WIND
FARM GRID-CONNECTED SYSTEM

| Parameter | Symbol | Value |
|---|---|---|
| Grid-connecting inductance | $L_{x1}$, $L_{x2}$, $L_{x3}$/H | 0.3e-3, 0.24e-3, 0.18e-3 |
| Reference value of active current | $i^*_{gd1}$, $i^*_{gd2}$, $i^*_{gd3}$/p.u. | 0.833, 0.667, 0.556 |
| DC voltage | $U_{dc}$/kV | 1.2 |

Case 1: set a disturbance in the current loop of PMSG1 at t=2 s, which causes self-excited oscillation.

Case 2: At the same time of self-excited oscillation, switch on a sub-synchronous oscillation source of 20 Hz at t=2 s, which causes sub-synchronous forced oscillation.

Case 3: At the same time of self-excited oscillation, switch on sub/super synchronous oscillation sources of 20 Hz and 80 Hz at t=2 s, which causes sub/super synchronous forced oscillation.

The change of oscillating current and its spectrum analysis under three cases are analyzed respectively in the present embodiment, and the proposed parameter tuning strategy is verified.

Figure 4:
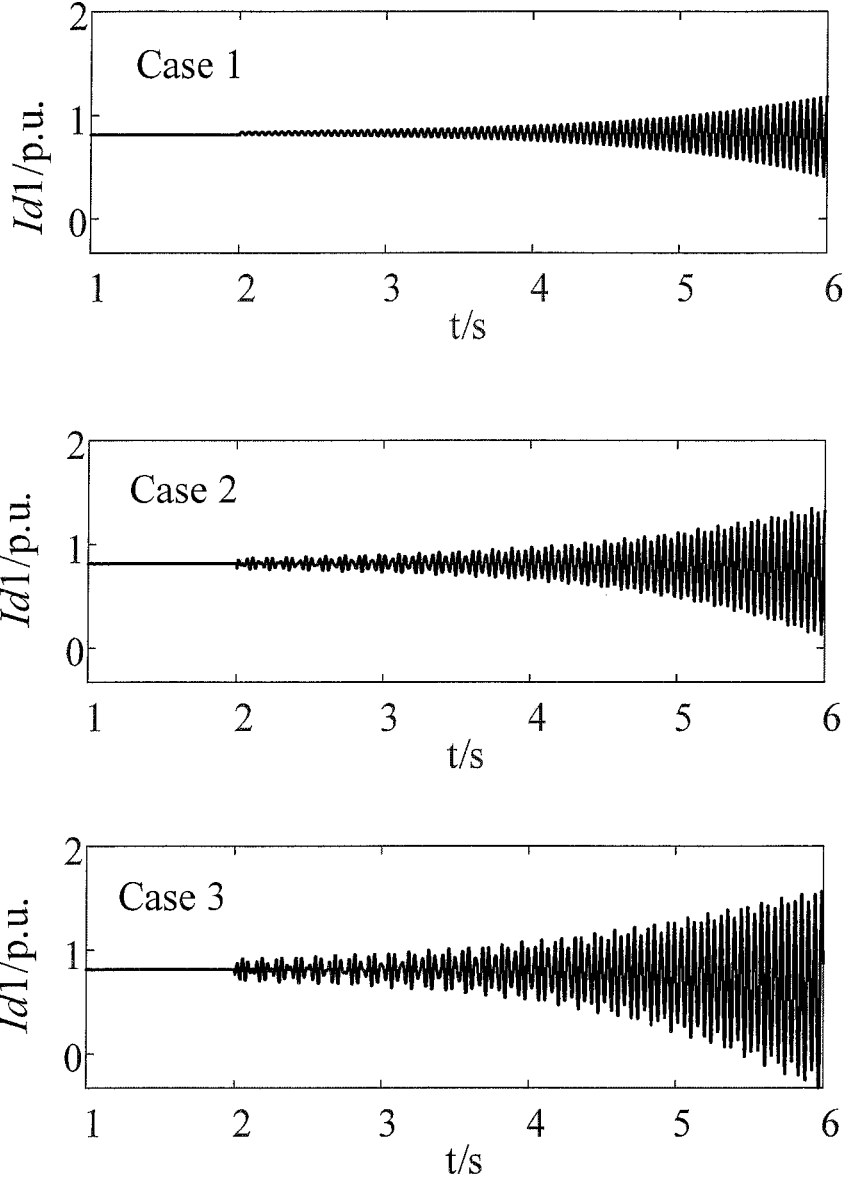
FIG. 4 is variation curve of d-axis current of direct-drive wind turbine PMSG1 in three oscillation cases in Embodiment 3 of the present application.
Figure 5:
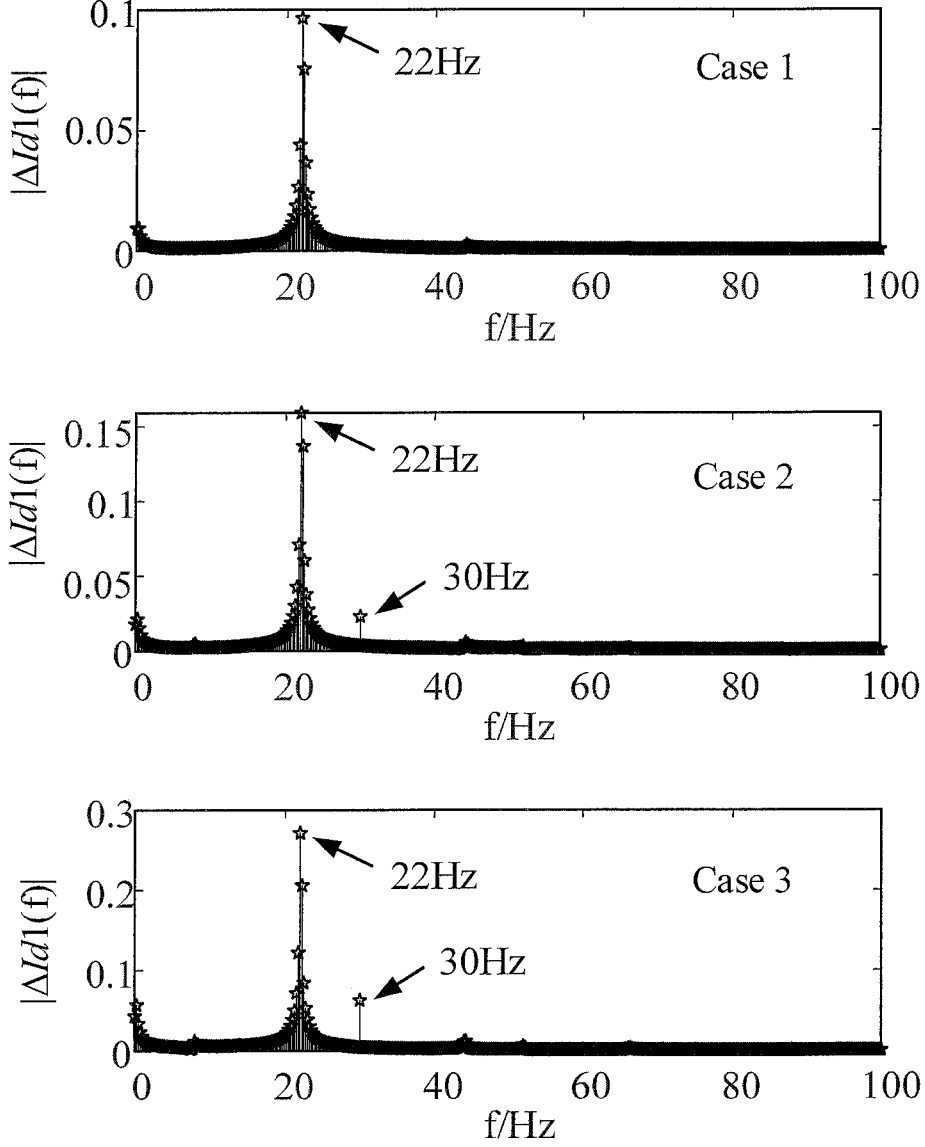
FIG. 5 is spectral analysis of d-axis current of direct-drive wind turbine PMSG1 in three oscillation cases in Embodiment 3 of the present application.

According to FIGS. 4-5, the wind farm is disturbed and self-excited oscillation occurs, and the frequency of the oscillation current in the dq axis is 22 Hz in case 1. While the oscillating current will also have a frequency component of 30 Hz in case 2 and 3 due to the existence of the forced oscillation source. Moreover, the amplitude of case 3 is significantly larger than that of case 2. The wind farm exhibits negative damping and the oscillations in three cases all diverge.

Figure 6:
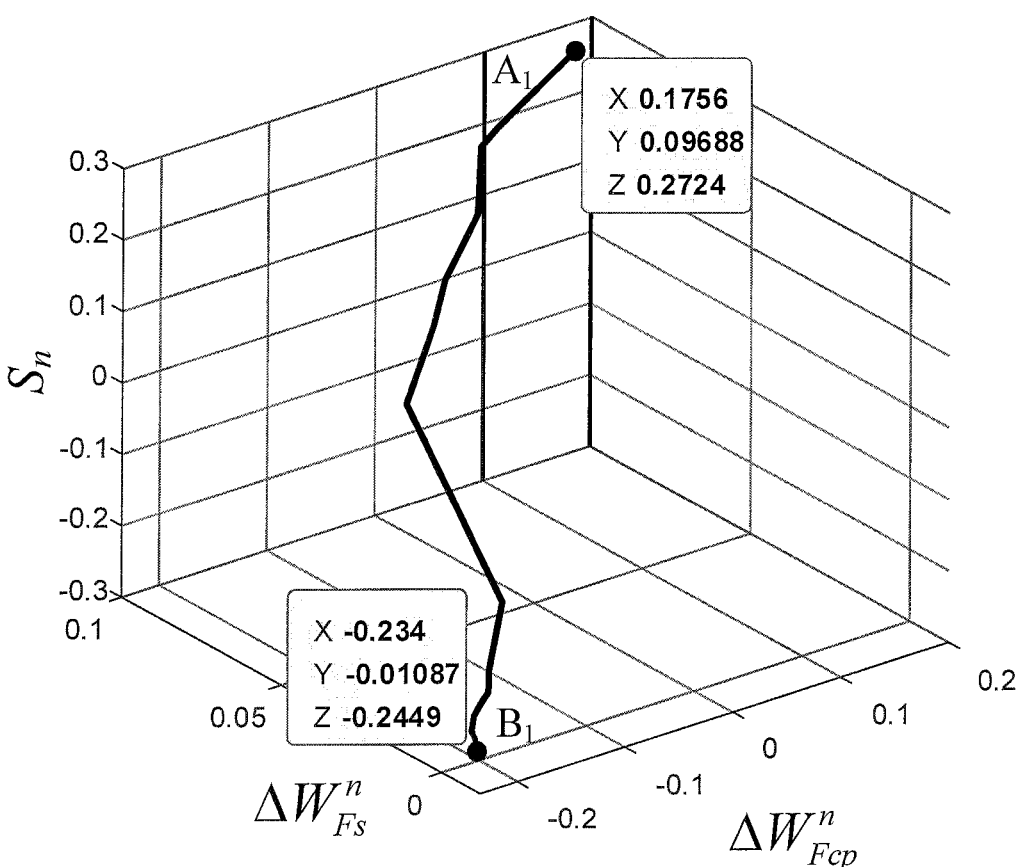
FIG. 6 is optimization of the objective function in self-excited oscillation case in Embodiment 3 of the present application.
Figure 7:
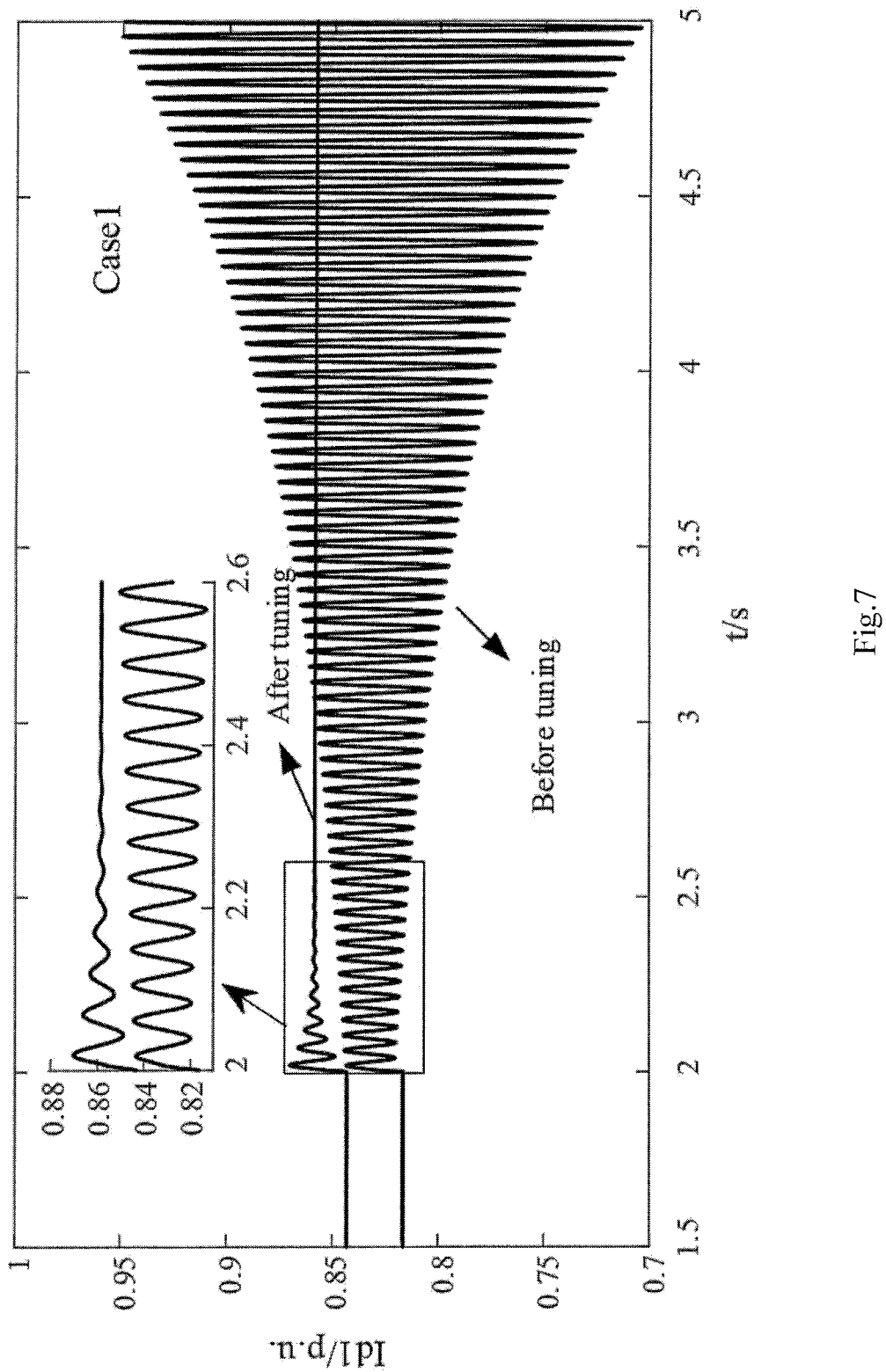
FIG. 7 is comparison diagram of d-axis oscillation current of PMSG1 before and after parameter tuning in self-excited oscillation case in Embodiment 3 of the present application.

It can be seen from FIGS. 6-7 that, $A_1$ represents the initial state, when the inter-generator coupling interaction energy and the generator-grid interaction energy are respectively 0.1756 p.u. and 0.09688 p.u., and the corresponding objective function is 0.2724 p.u. Since the overall farm-grid interaction dynamic energy is greater than 0, the stability condition is not satisfied, and the decision variables need to be adjusted. After 50 iterations, the objective function reaches $B_1$, the inter-generator coupling interaction energy and the generator-grid interaction energy are respectively -0.2347 p.u. and -0.01207 p.u., and the corresponding objective function is -0.2468 p.u. Since the overall farm-grid interaction dynamic energy is less than 0, the damping of the system is positive, and the system can return to the stable state after being disturbed. The maximum amplitude after the parameter tuning is [0.8488 p.u., 0.8703 p.u.]. The oscillation is effectively suppressed within 30 ms, and the system reaches a new stable equilibrium point of 0.859 p.u. Thus the anti-disturbance capability is improved significantly.

TABLE 2

PARAMETERS AFTER PARAMETER TUNING
IN SELF-EXCITED OSCILLATION

| | $K_P$ | $K_{P\theta}$ | $L_x$ | $i^*_{gd}$ |
|---|---|---|---|---|
| PMSG1 | 0.98e-3 | 0.665 | 0.14e-3 | 0.841 |
| PMSG2 | 0.96e-3 | 0.795 | 0.17e-3 | 0.688 |
| PMSG3 | 0.81e-3 | 0.632 | 0.17e-3 | 0.527 |

Figure 8:
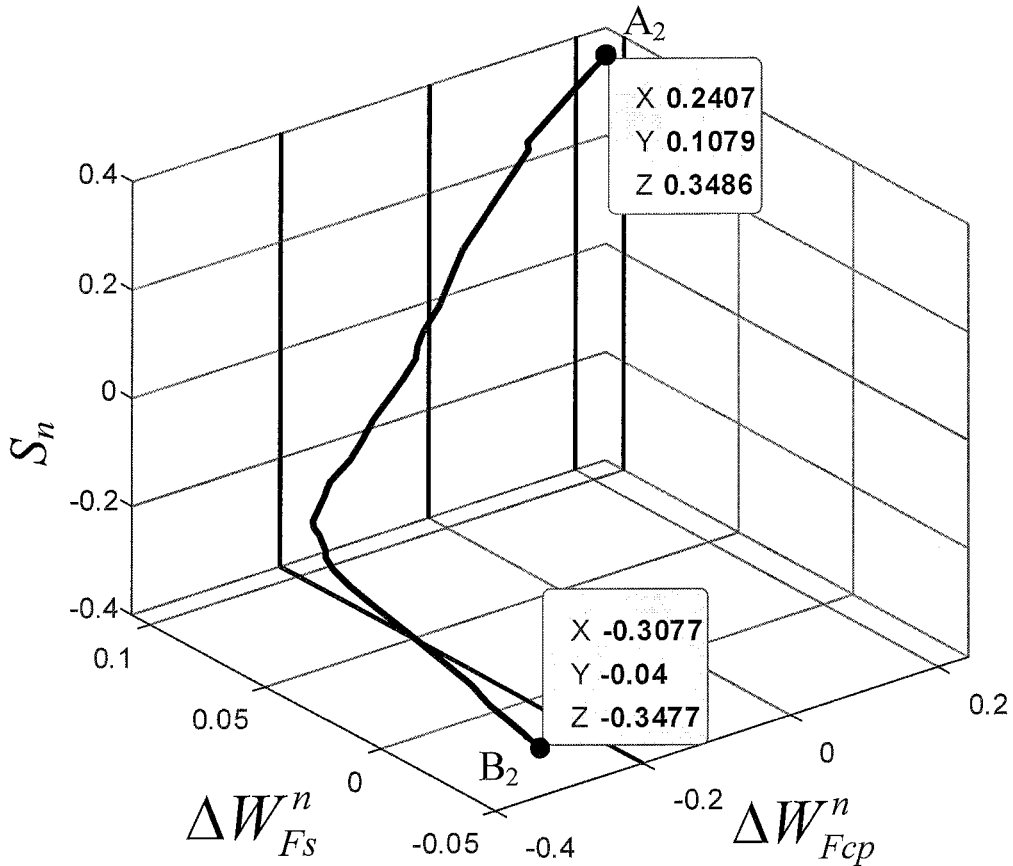
FIG. 8 is optimization of the objective function in sub-synchronous forced oscillation case in Embodiment 3 of the present application.
Figure 9:
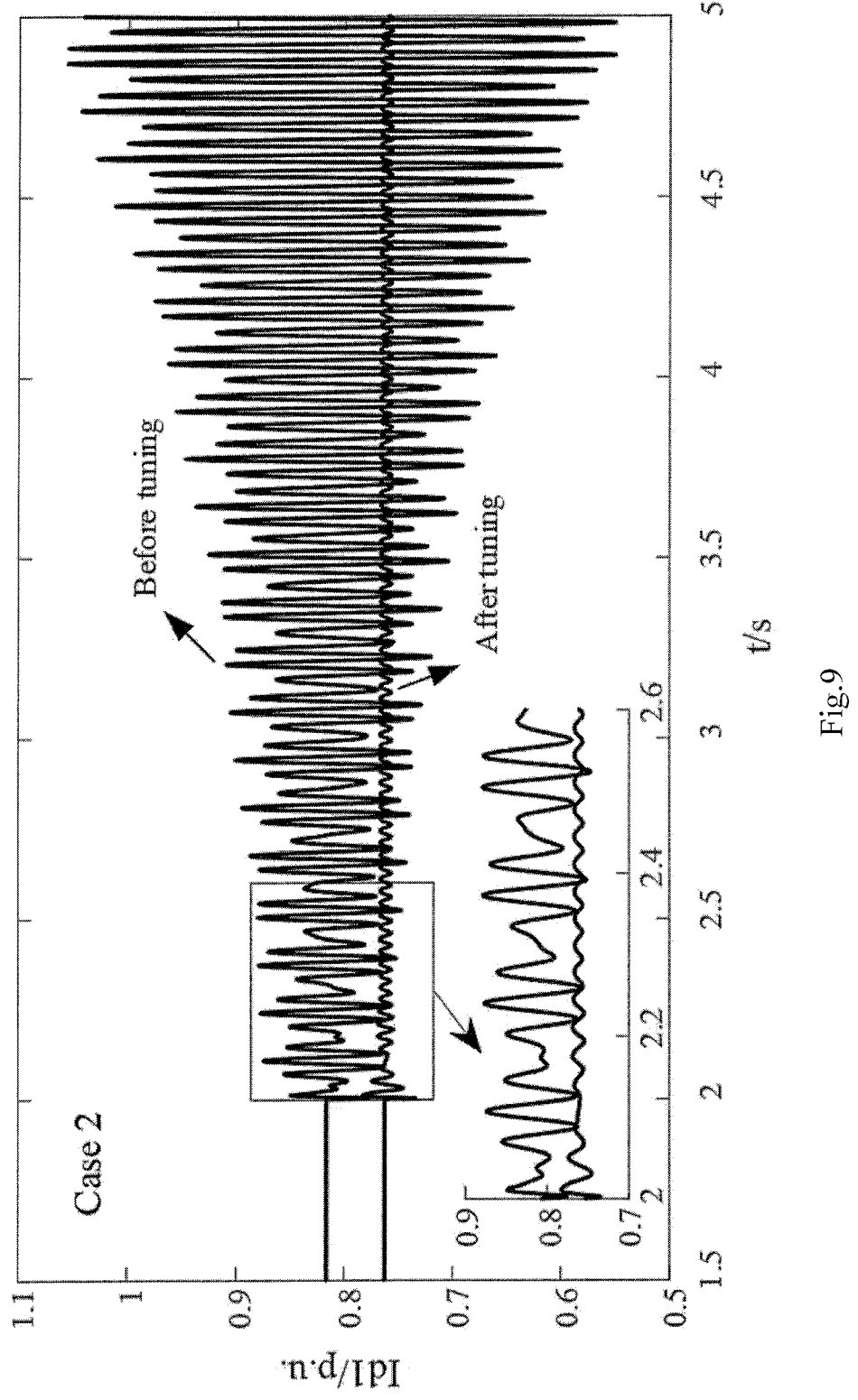
FIG. 9 is comparison diagram of d-axis oscillation current of PMSG1 before and after parameter tuning in sub-synchronous forced oscillation case in Embodiment 3 of the present application.

It can be seen from FIGS. 8-9 that, $A_2$ represents the initial state, when the inter-generator coupling interaction energy and the generator-grid interaction energy are respectively 0.2407 p.u. and 0.1079 p.u., and the corresponding objective function is 0.3486 p.u. After 50 iterations, the objective function reaches $B_2$, the inter-generator coupling interaction energy and the generator-grid interaction energy are respectively -0.3077 p.u. and -0.04 p.u., and the corresponding objective function is -0.3477 p.u. Since the overall farm-grid interaction dynamic energy is less than 0, the damping of the system turns positive, and the system can return to the stable state after being disturbed. The maximum amplitude after the parameter tuning is [0.7459 p.u., 0.7828 p.u.]. The oscillation is suppressed within 20 ms. A constant-amplitude oscillation still exists due to the forced oscillation source, but the oscillation amplitude decreases obviously to [0.7568 p.u., 0.7671 p.u.]. Thus, the anti-disturbance capability is improved significantly.

TABLE 3

PARAMETERS AFTER PARAMETER TUNING IN
SUB-SYNCHRONOUS FORCED OSCILLATION

| | $K_P$ | $K_{P\theta}$ | $L_x$ | $i^*_{gd}$ |
|---|---|---|---|---|
| PMSG1 | 0.68e-3 | 0.823 | 0.09e-3 | 0.768 |
| PMSG2 | 0.76e-3 | 0.645 | 0.12e-3 | 0.682 |
| PMSG3 | 0.82e-3 | 0.692 | 0.15e-3 | 0.606 |

Figure 10:
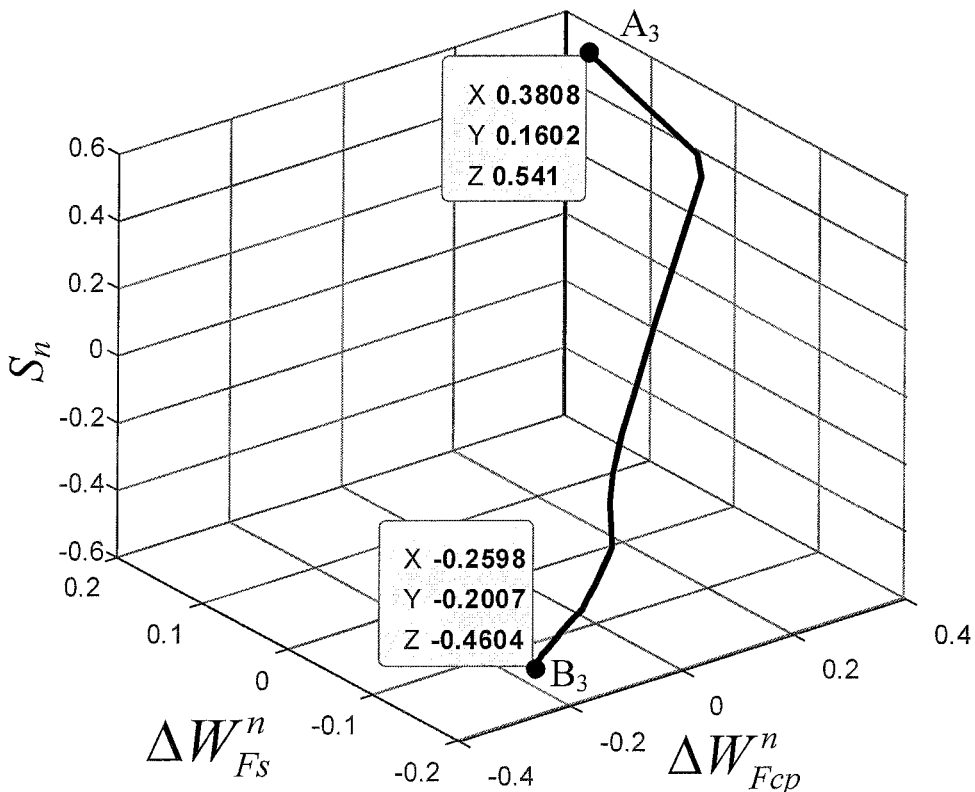
FIG. 10 is optimization of the objective function in sub/super synchronous forced oscillation case in Embodiment 3 of the present application.
Figure 11:
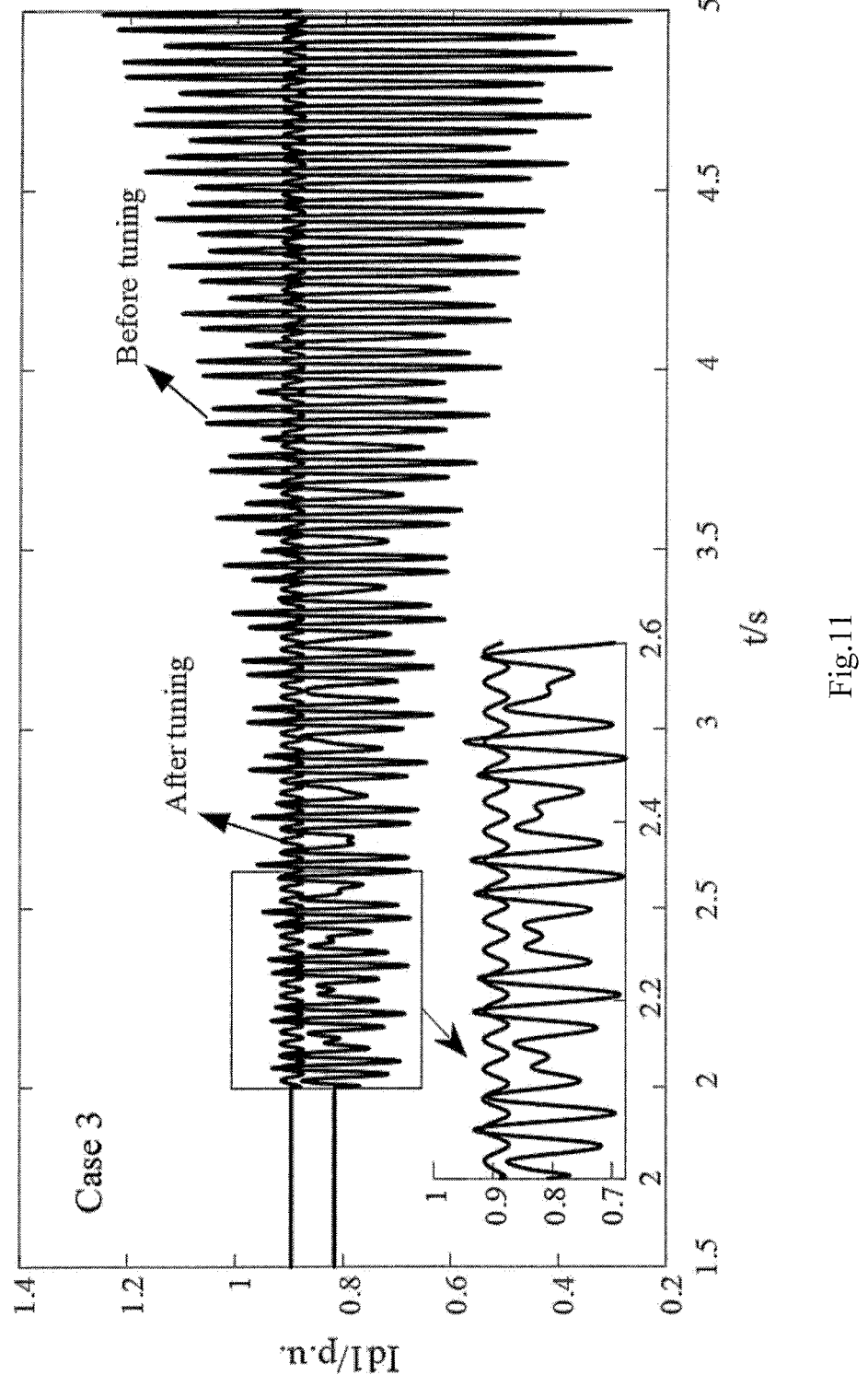
FIG. 11 is comparison diagram of d-axis oscillation current of PMSG1 before and after parameter tuning in sub/super synchronous forced oscillation case in Embodiment 3 of the present application.

It can be seen from FIGS. 10-11 that, $A_3$ represents the initial state, when the inter-generator coupling interaction energy and the generator-grid interaction energy are respectively 0.3808 p.u. and 0.1602 p.u., and the corresponding objective function is 0.541 p.u. After 50 iterations, the objective function reaches $B_3$, the inter-generator coupling interaction energy and the generator-grid interaction energy are respectively -0.2601 p.u. and -0.2028 p.u., and the corresponding objective function is -0.4628 p.u. Since the overall farm-grid interaction dynamic energy is less than 0, the damping turns positive, and the system can return to the stable state after being disturbed. The sub/super synchronous forced oscillation is suppressed soon after the parameter tuning, and its oscillation amplitude decreases to [0.8761 p.u., 0.9155 p.u.]. A constant-amplitude oscillation still exists due to the forced oscillation source, but the anti-disturbance capability is greatly improved.

TABLE IV

PARAMETERS AFTER PARAMETER TUNING IN SUB/SUPER
SYNCHRONOUS FORCED OSCILLATION

| | $K_P$ | $K_{P\theta}$ | $L_x$ | $i^*_{gd}$ |
|---|---|---|---|---|
| PMSG1 | 0.001 | 0.982 | 0.18e-3 | 0.846 |
| PMSG2 | 0.86e-3 | 0.764 | 0.20e-3 | 0.632 |
| PMSG3 | 0.83e-3 | 0.852 | 0.13e-3 | 0.578 |

Therefore, by comparing with the overall farm-grid interaction dynamic energy calculated by the embodiment of the present application, it is known that the overall farm-grid interaction dynamic energy calculated by the present application meets the accuracy requirements, and the system stability can be reliably evaluated according to its positive and negative values. At the same time, the proposed optimization model of key control parameters of the direct-drive wind farm can effectively improve the anti-interference ability and reliably suppress sub/super synchronous oscillation.

Those skilled in the art can understand that all or part of the process of realizing the above embodiment method can be completed by instructing the relevant hardware through a computer program, and the program can be stored in a computer-readable storage medium. Wherein, the computer-readable storage medium is a disk, optical disk, read-only storage memory or random storage memory, etc.

The above are only preferred specific embodiments of the present application, but the scope of protection of the present application is not limited to this. Any change or replacement that can easily be thought of by any person familiar with the technical field within the scope of the disclosed technology of the present application should be included in the scope of protection of the present application.

What is claimed is:

1. A direct-drive wind farm parameter tuning method considering the interaction between generators, comprises the following steps:

collecting initial oscillation current of each direct-drive wind turbine port in the direct-drive wind farm by the phase measurement unit (PMU);

according to the collected data, taking a period of dominant oscillation mode as an iteration period to calculate an overall farm-grid interaction dynamic energy and parameter tuning index of the direct-drive wind farm in current iteration period;

obtaining stability level of the direct-drive wind farm based on the overall farm-grid interaction dynamic energy in the current iteration period; when the system is unstable, an optimization model of key control parameters is established with a minimum value of the parameter tuning index in the current iteration period as an objective function and ranges of each key control parameters as constraint conditions, wherein the key control parameters comprise: a current loop proportional gain, a phase-locked loop proportional gain, a grid-connected line inductance, an active current reference value;

determining optimal key control parameter values based on the optimization model of the key control parameters, and tuning the key control parameters of the direct-drive wind farm according to the optimal key control parameter values.

2. The direct-drive wind farm parameter tuning method considering the interaction between generators according to claim 1, wherein, based on the collected data, the overall farm-grid interaction dynamic energy and the parameter tuning index of the direct-drive wind farm in the current iteration period are calculated by taking the period of the dominant oscillation mode as the iteration period, comprising:

taking the collected data as initial iteration period data, generator-grid interaction dynamic energy, inter-generator coupling interaction dynamic energy and inter-generator induction interaction dynamic energy of each Permanent Magnetic Synchronous Generator (PMSG) in each iteration period are calculated, where the period of dominant oscillation mode is the iteration period;

based on the generator-grid interaction dynamic energy, the inter-generator coupling interaction dynamic energy and the inter-generator induction interaction dynamic energy of each PMSG in each iteration period, obtaining the overall farm-grid interaction dynamic energy of the direct-drive wind farm in the current iteration period;

based on the generator-grid interaction dynamic energy, the inter-generator coupling interaction dynamic energy of each PMSG in each iteration period, obtaining the parameter tuning index of the direct-drive wind farm in the current iteration period.

3. The direct-drive wind farm parameter tuning method considering the interaction between generators according to claim 1, the key control parameter optimization model is expressed as:

$$
\begin{cases}
\min_{\alpha} S_n = \eta_F(\alpha) \\
\text{s.t. } P(K) = 0 \\
K_{P\_min}^j \le K_P^j \le K_{P\_max}^j \\
K_{P\theta\_min}^j \le K_{P\theta}^j \le K_{P\theta\_max}^j \\
L_{xj\_min} \le L_{xj} \le L_{xj\_max} \\
i_{gdj\_min}^* \le i_{gdj}^* \le i_{gdj\_max}^* \\
\alpha = [K_P^j, K_{P\theta}^j, L_{xj}, i_{gdj}^*]
\end{cases}
,
$$

where $S_n$ is the objective function of the current iteration period, nr is the parameter tuning index of the current iteration period, $P(K)=0$ means that the power flow meets the static security and stability conditions;

$$
K_{P\_min}^j \text{ and } K_{P\_max}^j
$$

are the lower and upper limit of the current loop proportional gain $$
K_P^j
$$

of the jth PMSG respectively;

$$
K_{P\theta\_min}^j \text{ and } K_{P\theta\_max}^j
$$

are the lower and upper limit of the PLL proportion gain $$
K_{P\theta}^j
$$

of the jth PMSG respectively; $L_{xj\_min}$ and $L_{xj\_max}$ are the lower and upper limit of the integration distance of the jth PMSG respectively;

$$
i_{gdj\_min}^* \text{ and } i_{gdj\_max}^*
$$

are the lower and upper limit of the reference value of active current of the jth PMSG respectively; $\alpha$ is set of decision variables.

4. The direct-drive wind farm parameter tuning method considering the interaction between generators according to claim 3, wherein, the parameter tuning index ng of the direct-drive wind farm in the current iteration period is expressed as:

$$
\eta_f = \Delta W_{Fs}^n + \Delta W_{Fcp}^n.
$$

where $$\Delta W_{Fs}^n$$

is the overall generator-grid interaction dynamic energy of the direct-drive wind farm after n iteration periods, $$\Delta W_{Fcp}^n$$

is the overall inter-generator coupling interaction dynamic energy of the direct-drive wind farm after n iteration periods, and n is the number of iteration periods from the initial iteration period to the current iteration period;

the overall farm-grid interaction dynamic energy $$\Delta W_F^n$$

of the direct-drive wind farm after n iteration periods is expressed as:

$$\Delta W_F^n = \Delta W_{Fs}^n + \Delta W_{Fcp}^n + \Delta W_{Fin}^n$$

where $$\Delta W_{Fin}^n$$

is the overall inter-generator induction interaction dynamic energy of the direct-drive wind farm after n iteration periods.

5. The direct-drive wind farm parameter tuning method considering the interaction between generators according to claim 4, wherein, the stability level of the direct-drive wind farm is obtained based on the overall farm-grid interaction dynamic energy $$\Delta W_F^n$$

after n iteration periods, comprising:
   when $$\Delta W_F^n < 0,$$

the direct-drive wind farm has a positive damping effect on oscillation, and the system is in a stable state; the smaller the value, the higher the stability level;
   when $$\Delta W_F^n = 0,$$

the direct-drive wind farm has no damping effect on the oscillation, and the system is in a critical stable state;

when $$\Delta W_F^n > 0,$$

the direct-drive wind farm has a negative damping effect on the oscillation, and the system oscillation divergence will be completely unstable.

6. The direct-drive wind farm parameter tuning method considering the interaction between generators according to claim 4, wherein,
   the overall generator-grid interaction dynamic energy $$\Delta W_{Fs}^n$$

of the direct-drive wind farm after n iteration periods is expressed as:

$$\Delta W_{Fs}^n = \sum_{k=1}^n \sum_{j=1}^m \sum_{\substack{i=1 \\ i \neq j}}^m \Delta W_{js}^{(k)}$$

where $$\Delta W_{js}^{(k)}$$

represents the generator-grid interaction dynamic energy of the jth PMSG in the kth iteration period, and m represents total number of PMSGs;
   the overall inter-generator coupling interaction dynamic energy $$\Delta W_{Fcp}^n$$

of the direct-drive wind farm after n iteration periods is expressed as:

$$\Delta W_{Fcp}^n = \sum_{k=1}^n \sum_{j=1}^m \sum_{\substack{i=1 \\ i \neq j}}^m \Delta W_{ij\_cp}^{(k)}$$

where $$\Delta W_{ij\_cp}^{(k)}$$

represents the inter-generator coupling interaction dynamic energy between the jth PMSG and the ith PMSG in the kth iteration period;
   the overall inter-generator induction interaction dynamic energy of the direct-drive wind farm after n iteration periods $$\Delta W_{Fin}^n$$

is expressed as:

$$\Delta W_{Fin}^n = \sum_{k=1}^{n} \sum_{j=1}^{m} \sum_{\substack{i=1 \\ i \ne j}}^{m} \Delta W_{ij\_in}^{(k)}$$

where $$\Delta W_{ij\_in}^{(k)}$$

represents the inter-generator induction interaction dynamic energy between the jth PMSG and the ith PMSG in the kth iteration period.

7. The direct-drive wind farm parameter tuning method considering the interaction between generators according to claim 6, wherein, the generator-grid interaction dynamic energy of the jth PMSG in the kth iteration period $$\Delta W_{js}^{(k)}$$

is expressed as:

$$\Delta W_{js}^{(k)} = 0.5\omega \sqrt{(U_{Bd0j} + I_{gd0j}R_s)^2 + [\omega I_{gd0j}(L_s + L_{sj})]^2}$$

$$\sum_{r=1}^{4}\sum_{t=1}^{4}(-1)^r C_{rt}|G_{dr}^{jK}| \left[ \begin{array}{l} |M_{jd}^j||G_{dt}^{jK}|os(\varphi_{gdr}^{jk} - \varphi_{gdt}^{jk} - \varphi_{d1t}^j) + \\ |M_{jq}^j||G_{qt}^{jK}|\cos(\varphi_{gdr}^j - \varphi_{gqt}^{jk} - \varphi_{q1t}^j) \end{array} \right] \Delta t - 0.5\omega\omega_0$$

$$I_{gd0j}(L_s + L_{xj}) \left\{ \begin{array}{l} \sum_{r=1,3}\sum_{t=1}^{4}C_{rt}|G_{qr}^{jK}| \left[ \begin{array}{l} -|M_{jd}^j||G_{dt}^{jK}|\cos(\varphi_{gqr}^{jk} - \varphi_{gdt}^{jk} - \varphi_{d2t}^j) - \\ |M_{jq}^j||G_{qt}^{jK}|\cos(\varphi_{gqr}^{jk} - \varphi_{gqt}^{jk} - \varphi_{q2t}^j) \end{array} \right] + \\ \sum_{r=2,4}\sum_{t=1}^{4}C_{rt}|G_{qr}^{jK}| \left[ \begin{array}{l} |M_{jd}^j||G_{dt}^{jK}|\sin(\varphi_{gqr}^{jk} - \varphi_{gdt}^{jk} - \varphi_{g2t}^j) + \\ |M_{jq}^j||G_{qt}^{jK}|\sin(\varphi_{gqr}^{jk} - \varphi_{gqt}^{jk} - \varphi_{q2t}^j) \end{array} \right] \end{array} \right\}$$

$$\Delta t + 0.5\omega \sqrt{R_s^2 + \omega^2(L_s + L_{sj})^2}$$

$$\left\{ \begin{array}{l} \sum_{r=1,3}\sum_{t=1}^{4}(-1)^{t+1}C_{rt} \left[ \begin{array}{l} |G_{dr}^{jK}||G_{qt}^{jK}|\cos(\varphi_{gdr}^{jk} - \varphi_{gqt}^{jk} - \varphi_{1t}^j) - \\ |G_{qr}^{jK}||G_{dt}^{jK}|\cos(\varphi_{gqr}^{jk} - \varphi_{gdt}^{jk} - \varphi_{1t}^j) \end{array} \right] + \\ \sum_{r=2,4}\sum_{t=1}^{4}(-1)^t C_{rt} \left[ \begin{array}{l} |G_{dr}^{jK}||G_{qt}^{jK}|\sin(\varphi_{gdr}^{jk} - \varphi_{gqt}^{jk} - \varphi_{1t}^j) - \\ |G_{qr}^{jK}||G_{dt}^{jK}|\sin(\varphi_{gqr}^{jk} - \varphi_{gdt}^{jk} - \varphi_{1t}^j) \end{array} \right] \end{array} \right\} \Delta t$$

where $$\varphi_{d1t}^j = \begin{cases} \sigma_r - \sigma_t + \varphi_c^j + \varphi_{mdj}^j & t = 1, 3 \\ \sigma_r - \sigma_t + \varphi_c^j + \varphi_{mdj}^j + 90° & t = 2, 4 \end{cases}$$

$$\varphi_{q1t}^j = \begin{cases} \sigma_r - \sigma_t + \varphi_c^j + \varphi_{mqj}^j & t = 1, 3 \\ \sigma_r - \sigma_t + \varphi_c^j + \varphi_{mqj}^j + 90° & t = 2, 4 \end{cases}$$

$$\varphi_{d2t}^j = \begin{cases} \sigma_r - \sigma_t + \varphi_{mdj}^j + 90° & t = 1, 3 \\ \sigma_r - \sigma_t + \varphi_{mdj}^j & t = 2, 4 \end{cases}$$

$$\varphi_{q2t}^j = \begin{cases} \sigma_r - \sigma_t + \varphi_{mqj}^j + 90° & t = 1, 3 \\ \sigma_r - \sigma_t + \varphi_{mqj}^j & t = 2, 4 \end{cases}$$

$$\varphi_{1t}^j = \begin{cases} \sigma_r - \sigma_t - \arctan[R_s/(\omega L_s + \omega L_{xj})] & t = 1, 3 \\ \sigma_r - \sigma_t + \arctan[(\omega L_s + \omega L_{xj})/R_s] & t = 2, 4 \end{cases}$$

$$\varphi_c^j = \begin{cases} \arctan[(U_{Bd0j} + I_{gd0j}R_s)/\omega I_{gd0j}(L_s + L_{xj})] & r = 1, 3 \\ -\arctan[\omega I_{gd0j}(L_s + L_{xj})/(U_{Bd0j} + I_{gd0j}R_s)] & r = 2, 4 \end{cases}$$

-continued $$\sigma_r = \begin{cases} \varphi_{sj} & r = 1, 2 \\ \varphi_{si} & r = 3, 4 \end{cases}$$

$$\sigma_t = \begin{cases} \varphi_{sj} & t = 1, 2 \\ \varphi_{si} & t = 3, 4 \end{cases}$$

$$C_{rt} = \begin{cases} I_{sj}I_{sj} & r, t \in [1, 2] \\ I_{si}I_{si} & r, t \in [3, 4] \\ I_{sj}I_{si} & \text{others} \end{cases}$$

$$\begin{cases} M_{jd}^j = M_{plij}(\omega_0 L_s + \omega_0 L_{xj}) \\ M_{jq}^j = M_{plij}(R_s + sL_s + sL_{xj}) \\ M_{plij} = \dfrac{sK_{P\theta}^j + K_{I\theta}^j}{s^2} \end{cases}$$

$$\begin{pmatrix} G_{d1}^{jK} & G_{d2}^{jK} & G_{d3}^{jK} & G_{d4}^{jK} \\ G_{q1}^{jK} & G_{q2}^{jK} & G_{q3}^{jK} & G_{q4}^{jK} \\ G_{d1}^{iK} & G_{d2}^{iK} & G_{d3}^{iK} & G_{d4}^{iK} \\ G_{q1}^{iK} & G_{q2}^{iK} & G_{q3}^{iK} & G_{q4}^{iK} \end{pmatrix} = \begin{pmatrix} G_{d1}^j & G_{d2}^j & G_{d3}^j & G_{d4}^j \\ G_{q1}^j & G_{q2}^j & G_{q3}^j & G_{q4}^j \\ G_{d1}^i & G_{d2}^i & G_{d3}^i & G_{d4}^i \\ G_{q1}^i & G_{q2}^i & G_{q3}^i & G_{q4}^i \end{pmatrix}^k$$

$$\begin{cases} G_{d1}^j = F_d^j[U_{Bd0j} + I_{gd0j}(R_s + sL_s + sL_{xj})] \\ G_{d2}^j = F_d^j I_{gd0j}\omega_0(-L_s - L_{xj}) \\ G_{d3}^j = F_d^j I_{gd0j}(R_s + sL_s) \\ G_{d4}^j = F_d^j(-I_{gd0j}\omega_0 L_s) \end{cases}$$

$$\begin{cases} G_{q1}^j = F_q^j(R_s + sL_s + sL_{xj}) \\ G_{q2}^j = F_q^j\omega_0(-L_s - L_{xj}) \\ G_{q3}^j = F_q^j(R_s + sL_s) \\ G_{q4}^j = F_q^j(-\omega_0 L_s) \end{cases}$$

$$F_d^j = \dfrac{\left(K_P^j + \dfrac{K_I^j}{s}\right)\left(K_{Pu}^j + \dfrac{K_{Iu}^j}{s}\right)}{K_P^j + \dfrac{K_I^j}{s} + R_{1j} + sL_{1j}} \dfrac{1}{sC_{dc}U_{dc0}};$$

$$F_q^j = -\dfrac{\left(K_P^j + \dfrac{K_I^j}{S}\right)\omega_0 C_f}{K_P^j + \dfrac{K_I^j}{s} + R_{1j} + sL_{1j}};$$

where $\omega$ is sub/super synchronous oscillation frequency in dq axis, $\omega_0$ is angular frequency of grid, $U_{Bd0j}$ and $I_{gd0j}$ are steady-state values of d-axis voltage and current at port of the jth PMSG respectively, $R_s$ and $L_s$ are resistance and inductance of AC line, $L_{xj}$ is inductance of grid-connecting line, $$\varphi_{gdr}^{jk}, \varphi_{gdt}^{jk}, \varphi_{gqr}^{jk} \text{ and } \varphi_{gqt}^{jk}$$

are phases of $$G_{dr}^{jK}, G_{dt}^{jK}, G_{qr}^{jK} \text{ and } G_{qt}^{jK}$$

respectively, $\varphi_{sj}$ and $\varphi_{si}$ are initial phase of initial sub/super synchronous current of the jth and ith PMSG respectively, $I_{sj}$ and $I_{si}$ are amplitudes of the initial sub/super synchronous current of the jth and ith PMSG respectively, s is Laplace operator $$\varphi_{mdj}^{j} \text{ and } \varphi_{mqj}^{j}$$

are phases of $$M_{jd}^{j} \text{ and } M_{jq}^{j}$$

respectively, $$K_{P}^{j} \text{ and } K_{I}^{j}$$

are current loop proportion and integral gains of the jth PMSG respectively, $$K_{P\theta}^{j} \text{ and } K_{I\theta}^{j}$$

are proportional and integral gains of phase-locked loop of the jth PMSG respectively, $$K_{Pu}^{j} \text{ and } K_{Iu}^{j}$$

are proportional and integral gains of the voltage outer loop of the jth PMSG respectively, $R_{1j}$ and $L_{1j}$ are equivalent resistance and inductance of filter respectively, $C_{dc}$ is DC capacitance, $U_{dc0}$ is steady-state value of DC bus voltage, $C_f$ is filter capacitor.

8. The direct-drive wind farm parameter tuning method considering the interaction between generators according to claim 6, wherein, the inter-generator coupling interaction dynamic energy between the jth PMSG and the ith PMSG in the kth iteration period $$\Delta W_{ij\_cp}^{(k)}$$

is expressed as:

$$\Delta W_{ij\_cp}^{(k)} = 0.5\omega\sqrt{(U_{Bd0j} + I_{gd0j}R_s)^2 + (\omega I_{gd0j}(L_s + L_{xj}))^2}$$

$$\sum_{r=1}^{4}\sum_{t=1}^{4}(-1)^{t}C_{rt}|G_{dr}^{jK}|\left[\begin{array}{l}|M_{id}^{j}||G_{dt}^{iK}|\cos(\varphi_{gdr}^{jk} - \varphi_{gdt}^{ik} - \varphi_{d3t}^{j}) + \\ |M_{iq}^{j}||G_{qt}^{iK}|\cos(\varphi_{gdr}^{jk} - \varphi_{gqt}^{ik} - \varphi_{q3t}^{j})\end{array}\right]\Delta t - 0.5\omega\omega_0$$

$$I_{gd0j}(L_s + L_{xj})\left\{\begin{array}{l}\sum_{r=1,3}^{4}\sum_{t=1}^{4}C_{rt}|G_{qr}^{jK}|\left[\begin{array}{l}-|M_{id}^{j}||G_{dt}^{iK}|\cos(\varphi_{gqr}^{jk} - \varphi_{gdt}^{ik} - \varphi_{d4t}^{j}) - \\ |M_{iq}^{j}||G_{qt}^{iK}|\cos(\varphi_{gqr}^{jk} - \varphi_{gqt}^{ik} - \varphi_{q4t})\end{array}\right] + \\ \sum_{r=2,4}^{4}\sum_{t=1}^{4}C_{rt}|G_{qr}^{jK}|\left[\begin{array}{l}|M_{id}^{j}||G_{dt}^{iK}|\sin(\varphi_{gqr}^{jk} - \varphi_{gdt}^{ik} - \varphi_{d4t}^{j}) + \\ |M_{iq}^{j}||G_{qt}^{iK}|\sin(\varphi_{gqr}^{jk} - \varphi_{gqt}^{ik} - \varphi_{q4t}^{j})\end{array}\right]\end{array}\right\}$$

$$\Delta t + 0.5\omega\sqrt{(I_{gd0j}R_s)^2 + (\omega I_{gd0j}L_s)^2}$$

$$\sum_{r=1}^{4}\sum_{t=1}^{4}(-1)^{r}C_{rt}|G_{dr}^{iK}|\left[\begin{array}{l}|M_{id}^{j}||G_{dt}^{jK}|\cos(\varphi_{gdr}^{ik} - \varphi_{gdt}^{jk} - \varphi_{d5t}^{j}) + \\ |M_{iq}^{j}||G_{qt}^{jK}|\cos(\varphi_{gdr}^{ik} - \varphi_{gqt}^{jk} - \varphi_{q5t}^{j})\end{array}\right]\Delta t -$$

-continued $$0.5\omega\omega_0 I_{gd0j}L_s\left\{\begin{array}{l}\sum_{r=1,3}^{4}\sum_{t=1}^{4}C_{rt}|G_{qr}^{iK}|\left[\begin{array}{l}-|M_{jd}^{j}||G_{dt}^{jK}|\cos(\varphi_{gqr}^{ik} - \varphi_{gdt}^{jk} - \varphi_{d2t}^{j}) - \\ |M_{jq}^{j}||G_{qt}^{jK}|\cos(\varphi_{gqr}^{ik} - \varphi_{gqt}^{jk} - \varphi_{q2t}^{j})\end{array}\right] + \\ \sum_{r=2,4}^{4}\sum_{t=1}^{4}C_{rt}|G_{qr}^{iK}|\left[\begin{array}{l}|M_{jk}^{j}||G_{dt}^{jK}|\sin(\varphi_{gqr}^{ik} - \varphi_{gdt}^{jk} - \varphi_{d2t}^{j}) + \\ |M_{jq}^{j}||G_{qt}^{jK}|\sin(\varphi_{gqr}^{ik} - \varphi_{gqt}^{jk} - \varphi_{q2t}^{j})\end{array}\right]\end{array}\right\}$$

$$\Delta t + 0.5\omega\sqrt{R_s^2 + (\omega L_s)^2}$$

$$\left\{\begin{array}{l}\sum_{r=1,3}^{4}\sum_{t=1}^{4}(-1)^{t+1}C_{rt}\left[\begin{array}{l}|G_{dr}^{jK}||G_{qt}^{iK}|\cos(\varphi_{gdr}^{jk} - \varphi_{gqt}^{ik} - \varphi_{2t}^{j}) - \\ |G_{qr}^{jK}||G_{dt}^{iK}|\cos(\varphi_{gqr}^{jk} - \varphi_{gdt}^{ik} - \varphi_{2t}^{j})\end{array}\right] + \\ \sum_{r=2,4}^{4}\sum_{t=1}^{4}(-1)^{t}C_{rt}\left[\begin{array}{l}|G_{dr}^{jK}||G_{qt}^{iK}|\sin(\varphi_{gdr}^{jk} - \varphi_{gqt}^{ik} - \varphi_{2t}^{j}) - \\ |G_{qr}^{jK}||G_{dt}^{iK}|\sin(\varphi_{gqr}^{jk} - \varphi_{gdt}^{ik} - \varphi_{2t}^{j})\end{array}\right]\end{array}\right\}\Delta t +$$

$$0.5\omega\omega_0 L_s\left\{\begin{array}{l}\sum_{r=1,3}^{4}\sum_{t=1}^{4}C_{rt}\left[\begin{array}{l}|G_{dr}^{jK}||G_{dt}^{iK}|\sin(\varphi_{gdr}^{jk} - \varphi_{gdt}^{ik} - \varphi_{d6t}^{j}) - \\ |G_{qr}^{jK}||G_{qt}^{iK}|\sin(\varphi_{gqr}^{jk} - \varphi_{gqt}^{ik} - \varphi_{g6t}^{j})\end{array}\right] + \\ \sum_{r=2,4}^{4}\sum_{t=1}^{4}C_{rt}\left[\begin{array}{l}|G_{dr}^{jK}||G_{dt}^{iK}|\cos(\varphi_{gdr}^{jk} - \varphi_{gdt}^{ik} - \varphi_{d6t}) - \\ |G_{qr}^{jK}||G_{qt}^{iK}|\cos(\varphi_{gqr}^{jk} - \varphi_{gqt}^{ik} - \varphi_{d6t})\end{array}\right]\end{array}\right\}\Delta t$$

where $$\varphi_{d3t}^{j} = \begin{cases}\sigma_r - \sigma_t + \varphi_c^{j} + \varphi_{mdi}^{j} & t = 1, 3 \\ \sigma_r - \sigma_t + \varphi_c^{j} + \varphi_{mdi}^{j} + 90° & t = 2, 4\end{cases};$$

$$\varphi_{q3t}^{j} = \begin{cases}\sigma_r - \sigma_t + \varphi_c^{j} + \varphi_{mqi}^{j} & t = 1, 3 \\ \sigma_r - \sigma_t + \varphi_c^{j} + \varphi_{mqi}^{j} + 90° & t = 2, 4\end{cases}$$

$$\varphi_{d4t}^{j} = \begin{cases}\sigma_r - \sigma_t + \varphi_{mdi}^{j} + 90° & t = 1, 3 \\ \sigma_r - \sigma_t + \varphi_{mdi}^{j} & t = 2, 4\end{cases};$$

$$\varphi_{q4t}^{j} = \begin{cases}\sigma_r - \sigma_t + \varphi_{mqi}^{j} + 90° & t = 1, 3 \\ \sigma_r - \sigma_t + \varphi_{mqi}^{j} & t = 2, 4\end{cases}$$

$$\varphi_{d5t}^{j} = \begin{cases}\sigma_r - \sigma_t + \varphi_p^{j} + \varphi_{mdj}^{j} & t = 1, 3 \\ \sigma_r - \sigma_t + \varphi_p^{j} + \varphi_{mdj}^{j} + 90° & t = 2, 4\end{cases};$$

$$\varphi_{d5t}^{j} = \begin{cases}\sigma_r - \sigma_t + \varphi_p^{j} + \varphi_{mqj}^{j} & t = 1, 3 \\ \sigma_r - \sigma_t + \varphi_p^{j} + \varphi_{mqj}^{j} + 90° & t = 2, 4\end{cases}$$

$$\varphi_{q6t}^{j} = \begin{cases}\sigma_r - \sigma_t & t = 1, 3 \\ \sigma_r - \sigma_t + 90° & t = 2, 4\end{cases};$$

$$\varphi_{2t}^{j} = \begin{cases}\sigma_r - \sigma_t - \arctan[R_s/(\omega L_s)] & t = 1, 3 \\ \sigma_r - \sigma_t + \arctan[(\omega L_s)/R_s] & t = 2, 4\end{cases}$$

$$\varphi_p^{j} = \begin{cases}\arctan[R_s/(\omega L_s)] & r = 1, 3 \\ -\arctan[(\omega L_s)/R_s] & r = 2, 4\end{cases}; \begin{cases}M_{id}^{j} = M_{pllj}\omega_0 L_s \\ M_{iq}^{j} = M_{pllj}(R_s + sL_s)\end{cases}.$$

9. The direct-drive wind farm parameter tuning method considering the interaction between generators according to claim 6, wherein, the inter-generator induction interaction dynamic energy between the jth PMSG and the ith PMSG in the kth iteration period $$\Delta W_{ij\_in}^{(k)}$$

is expressed as:

$$\Delta W_{ij\_in}^{(k)} = 0.5\omega I_{gd0j}\sqrt{R_s^2 + (\omega L_s)^2}\sum_{r=1}^{4}\sum_{t=1}^{4}(-1)^{r}C_{rt}|G_{dr}^{iK}|$$

-continued $$\left[\begin{array}{l} \left|M_{id}^{j}\right|\left|G_{dt}^{iK}\right|\cos\left(\varphi_{gdr}^{ik}-\varphi_{gdt}^{ik}-\varphi_{d7t}^{j}\right)+ \\ \left|M_{iq}^{j}\right|\left|G_{qt}^{iK}\right|\cos\left(\varphi_{gdr}^{ik}-\varphi_{gqt}^{ik}-\varphi_{q7t}^{j}\right) \end{array}\right]\Delta t-0.5\omega\omega_0 I_{gd0j}L_s$$

$$\left\{\sum_{r=1,3}\sum_{t=1}^{4}C_{rt}\left|G_{qr}^{iK}\right|\left[\begin{array}{l} -\left|M_{id}^{j}\right|\left|G_{dt}^{iK}\right|\cos\left(\varphi_{gqr}^{ik}-\varphi_{gdt}^{ik}-\varphi_{d2t}^{j}\right)- \\ \left|M_{iq}^{j}\right|\left|G_{qt}^{iK}\right|\cos\left(\varphi_{gqr}^{ik}-\varphi_{gqt}^{ik}-\varphi_{q2t}^{j}\right) \end{array}\right]+ \atop \sum_{r=2,4}\sum_{t=1}^{4}C_{rt}\left|G_{qr}^{iK}\right|\left[\begin{array}{l} \left|M_{id}^{j}\right|\left|G_{dt}^{iK}\right|\sin\left(\varphi_{gqr}^{ik}-\varphi_{gdt}^{ik}-\varphi_{d2t}^{j}\right)+ \\ \left|M_{iq}^{j}\right|\left|G_{qt}^{iK}\right|\sin\left(\varphi_{gqr}^{ik}-\varphi_{gqt}^{ik}-\varphi_{q2t}^{j}\right) \end{array}\right]\right\}\Delta t$$

where $$\varphi_{d7t}^{j}=\begin{cases} \sigma_r-\sigma_t+\varphi_p^{j}+\varphi_{mdi}^{j} & t=1,3 \\ \sigma_r-\sigma_t+\varphi_p^{j}+\varphi_{mdi}^{j}+90° & t=2,4 \end{cases}$$

$$\varphi_{q7t}^{j}=\begin{cases} \sigma_r-\sigma_t+\varphi_p^{j}+\varphi_{mqi}^{j} & t=1,3 \\ \sigma_r-\sigma_t+\varphi_p^{j}+\varphi_{mqi}^{j}+90° & t=2,4 \end{cases}$$

10. A direct-drive wind farm parameter tuning system considering the interaction between generators, comprises a data acquisition module, a system stability evaluation module and a parameter optimization module;

the data acquisition module is used to collect the initial oscillation current of each PMSG port in the direct-driven wind farm;

the system stability evaluation module is used to, according to the collected data, take a period of the dominant oscillation mode as an iteration period to calculate an overall farm-grid interaction dynamic energy and parameter tuning index of the direct-drive wind farm in the current iteration period; obtaining stability level of the direct-drive wind farm based on the overall farm-grid interaction dynamic energy in the current iteration period;

the parameter optimization module is used to, according to the result of system stability assessment, when the system is unstable, establish an optimization model of key control parameters with the minimum value of the parameter tuning index in the current iteration period as an objective function and the ranges of each key control parameters as the constraint conditions, wherein the key control parameters comprise: a current loop proportional gain, a phase-locked loop proportional gain, a grid-connected line inductance, an active current reference value;

wherein the parameter optimization module is further used to, determine optimal key control parameter values based on the optimization model of the key control parameters, and tune the key control parameters of the direct-drive wind farm according to the optimal key control parameter values.

\* \* \* \* \*